US012399891B1

(12) United States Patent
Lai et al.

(10) Patent No.: US 12,399,891 B1
(45) Date of Patent: Aug. 26, 2025

(54) AUTOMATED PROCESSING OF A NATURAL LANGUAGE QUESTION BASED ON HETEROGENOUS DATA SOURCES USING A MACHINE LEARNING BASED LANGUAGE MODEL

(71) Applicant: Promethium, Inc., Menlo Park, CA (US)

(72) Inventors: Kaycee Kuan-Cheng Lai, San Carlos, CA (US); Ravikanth Kasamsetty, Union City, CA (US)

(73) Assignee: Promethium, Inc., Menlo Park, CA (US)

( * ) Notice: Subject to any disclaimer, the term of this patent is extended or adjusted under 35 U.S.C. 154(b) by 0 days.

(21) Appl. No.: 18/644,087

(22) Filed: Apr. 23, 2024

(51) Int. Cl.
*G06F 16/242* (2019.01)
(52) U.S. Cl.
CPC .................... *G06F 16/243* (2019.01)
(58) Field of Classification Search
CPC ...................................... G06F 16/243
USPC .......................................... 707/763
See application file for complete search history.

(56) References Cited

U.S. PATENT DOCUMENTS

| 10,769,176 | B2 * | 9/2020 | Chino | G06F 40/134 |
| 11,675,824 | B2 * | 6/2023 | Shirwadkar | G06F 16/36 |
| | | | | 707/737 |
| 2019/0087455 | A1 * | 3/2019 | He | G10L 15/22 |
| 2020/0327197 | A1 * | 10/2020 | Bhowal | G06N 5/041 |
| 2021/0209102 | A1 * | 7/2021 | Dinh | G06N 5/04 |
| 2022/0020377 | A1 * | 1/2022 | Paulraj | H04L 63/08 |
| 2022/0318860 | A1 * | 10/2022 | Dorch | G10L 15/28 |
| 2023/0216956 | A1 * | 7/2023 | Nesargi | H04M 3/5141 |
| | | | | 379/265.09 |
| 2024/0289407 | A1 * | 8/2024 | Rofouei | G06F 16/9577 |
| 2024/0338710 | A1 * | 10/2024 | Mico | G06Q 30/015 |
| 2024/0347156 | A1 * | 10/2024 | Paulett | G16H 10/60 |
| 2024/0354436 | A1 * | 10/2024 | Mukherjee | G06F 16/3344 |
| 2024/0403568 | A1 * | 12/2024 | Øhrn | G06F 40/40 |
| 2025/0045516 | A1 * | 2/2025 | Reyna Fernandez | |
| | | | | G06F 40/186 |
| 2025/0103908 | A1 * | 3/2025 | Rizk | G06N 3/10 |

\* cited by examiner

*Primary Examiner* — Cam Linh T Nguyen
(74) *Attorney, Agent, or Firm* — Fenwick & West LLP

(57) ABSTRACT

An analysis system connects to a set of data sources and perform natural language questions based on the data sources. The analysis system connects with the data sources and retrieves metadata describing data assets stored in each data source. The analysis system generates an execution plan for the natural language question. The analysis system finds data assets that match the received question based on the metadata. The analysis system ranks the data assets and presents the ranked data assets to users for allowing users to modify the execution plan. The analysis system may use execution plans of previously stored questions for executing new questions. The analysis system supports selective pre-processing of data to increase the data quality.

20 Claims, 22 Drawing Sheets

AUTOMATED PROCESSING OF A NATURAL LANGUAGE QUESTION BASED ON HETEROGENOUS DATA SOURCES USING A MACHINE LEARNING BASED LANGUAGE MODEL

FIELD OF INVENTION

This disclosure concerns querying data stored in data sources in general and more specifically to automated processing of a natural language question based on heterogeneous data sources using a machine learning based language model.

BACKGROUND

Organizations store data in multiple heterogeneous data sources, for example, relational databases, file systems, cloud storage, and so on. Furthermore, each type of data source may have multiple instances. Each instance of a data source may be provided by a different vendor. For example, the same organization may store some data in an ORACLE database and some data in SQLSERVER database. Each data source can be a complex system that requires an expert who can interact with the system. Due to these complexities, querying data stored by the organization is difficult. For example, users are required to have knowledge of database systems, knowledge of different data stores that store the information of the organization, knowledge of query languages for interacting with the database systems, and so on. Furthermore, various data assets may not use a consistent or intuitive naming scheme. For example, a user may not be able to derive the type of information stored in various columns of a database table by looking at the table names and column names, unless the schema designer named the tables and columns in a very intuitive way. Besides, there may be several tables and columns with similar names, thereby making it confusing for a user interested in answering questions based on data, which tables columns to use for a particular query. As a result, conventional techniques to querying data in a large organization require strong technical expertise and are difficult to use.

SUMMARY

An analysis system allows users to connect to a set of data sources and query across the data sources using natural language questions. The analysis system uses a language model (for example, a large language model) to generate a database query based on the natural language question. The data sources may be of different types, for example, a data source may be a relational database system and another data source may be a file system. The set of data sources form a distributed heterogeneous system. The analysis system connects with the data sources and retrieves and stores metadata describing data assets stored in each data source. For example, for a relational database system, the data assets may represent tables and for a file system, the data assets may be files. For a data source representing a relational database system, the analysis system may obtain the names of tables, columns and so on. For a data source representing a file system, the analysis system may obtain names of the files and description of the files. The analysis system uses the metadata to answer queries to data stored in the heterogeneous data sources using natural language questions.

The analysis system received a natural language question from a client device. The analysis system generates a prompt requesting a database query corresponding to the natural language question. The database query is requested using syntax of a database query language, for example, the structured query language (SQL). The analysis system sends the prompt to a machine learning based language model. The analysis system receives a database query using syntax of the database query language generated by the machine learning based language model. Since the database query is generated by the machine learning based language model, the database query including one or more generated data asset names that may not correspond to actual data assets stored in the data sources. Therefore, the analysis system determines a data asset corresponding to each generated data asset name based on metadata describing the data asset. The analysis system modifies the database query by replacing each of generated data asset name by a name of a data asset corresponding to the generated data asset name. The analysis system sends the modified database query for execution.

According to an embodiment, the analysis system presents a chat-interface to allow users to query heterogenous data sources using natural language interface. The analysis system configures the chat-interface for natural language-based querying of heterogeneous data sources and presents the chat-interface to a user via a client device. The analysis system receives a request from the user via the chat-interface to answer a natural language question based on data stored in one or more data assets. Each data asset is stored in a data source from a plurality of heterogenous data sources. The analysis system prompts the user via the chat-interface to select an option for answering the natural language question from one of: (1) searching for data maps previously generated using a machine learning based language model, or (2) generating a new data map for the natural language question using the machine learning based language model. The analysis system answers the natural language question using the selected option.

According to an embodiment, if the analysis system receives a selection from the user indicating the user wants the analysis system to generate a new data map for the natural language question, the analysis system generates a prompt requesting a database query corresponding to the natural language question and sends the prompt to the machine learning based language model. The analysis system receives a database query using syntax of a database query language generated by the machine learning based language model and answers the natural language question is based on the database query.

According to an embodiment, the analysis system receives a user selection to use a data map previously generated using a machine learning based language model. In response to this user selection, the analysis system ranks a set of data maps previously generated based on a matching of the natural language question and each of the data maps and selects a data map based on the ranking.

According to an embodiment, an option presented to the user for answering the natural language question is identifying a stored natural language question previously answered that matches the natural language question. If the analysis system receives a user selection indicating that the user wants to use a stored natural language question previously answered that matches the natural language question, the analysis system ranks a set of stored natural language question previously answered based on a matching of the natural language question and each of the stored natural language question and selects a stored natural language question based on the ranking.

According to an embodiment, the analysis system automatically processes a natural language question to generate an answer without requiring further input from the user. The analysis system receives a request to process a natural language question based on the plurality of data sources from a client device. The analysis system matches the natural language question against one or more data maps previously created. Each data map is based on data assets stored in the plurality of data sources. The analysis system determines whether a data map previously created is usable for answering the natural language question. If the analysis system determines that none of the data maps previously created can be used for answering the natural language question, the analysis system generates a new data map for the natural language question based on a database query generated using a machine learning based language model. The analysis system may present the results directly or generate a chart based on the data map and sends the results or chart for display via the client device.

Embodiments of a computer readable storage medium store instructions for performing the steps of the above methods. Embodiments of a computer system comprise one or more computer processors and a computer readable storage medium that stores instructions for performing the steps of the above methods.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 8A is the screenshot of a user interface displaying a reason determined by the analysis system for selecting a data asset, according to an embodiment.

FIG. 8B is the screenshot of a user interface displaying a reason determined by the analysis system for selecting a field of a data asset, according to an embodiment.

FIG. 10 illustrates a data sample that may be provided to the language model for generating a more precise database query according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Conventional techniques require users to extract data from multiple sources to analyze and determine whether the data serves a specified purpose, for example, whether it answers a given question. Conventional systems perform ETL (extract, transform, and load) process to extract all data from each data source to be able to join the data. Following steps are typically performed for answering a question based on data stored across a plurality of heterogeneous data sources: (1) Ask user to identify each data source. (2) Perform ETL (extract transform load) job to move all data from the data source. (3) Receive from users, a filter and determine a subset of the data obtained from each data source. (4) Receive from users, a query to join the subset of data from each data source. (5) Generate a table storing the join result. (6) Execute the query using the table, for example, using a BI (business intelligence) tool.

Embodiments of the analysis system allows users to ask natural language questions without requiring them to have technical knowledge of the underlying data sources. The analysis system uses a language model to generate a database query based on a natural language question received from a user. According to an embodiment, the analysis system generates a prompt for requesting the language model to generate the database query based on the natural language without providing the language model with metadata describing the various data assets of the heterogeneous data sources. As a result, the language model generates names of data assets and fields of data assets without having any information about the actual data assets and data fields. Accordingly, the data assets and field names used in the database query are hallucinated by the language model. The analysis system determines a data map based on the database query that uses actual data assets and fields that are suitable for answering the natural language question. The analysis system modifies the database query to use the best possible data assets and fields and executes the database query. As a result, the analysis system is able to use a remote service that provides language models such as large language models without exposing the metadata of the data assets to the service. The analysis system answers natural language questions based on heterogeneous data sources while maintaining privacy of the metadata and data stored in the heterogeneous data sources.

Figure 1:
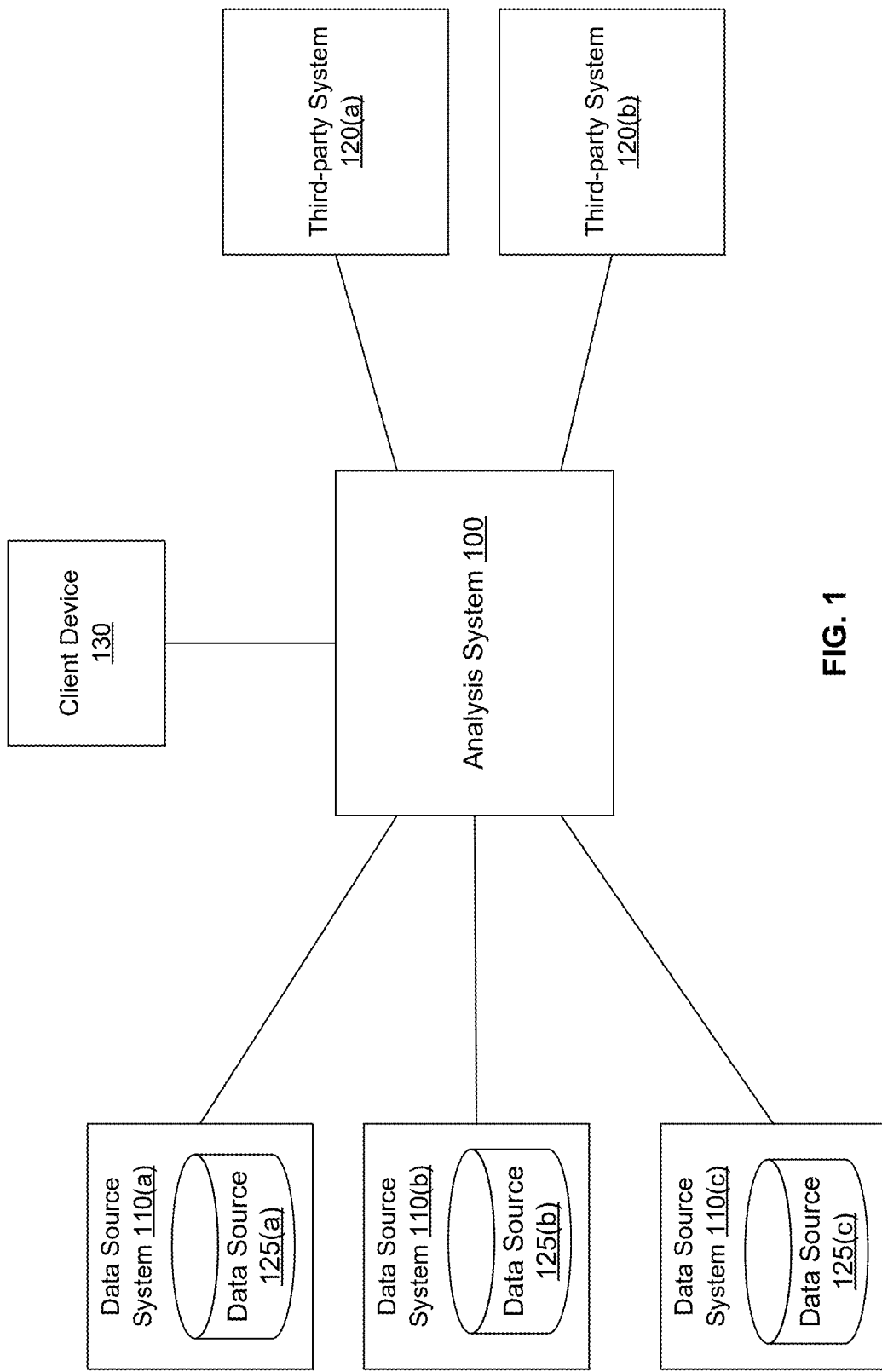
FIG. 1 is an overall system environment for performing data model based analysis of data, in accordance with an embodiment.

FIG. 1 is an overall system environment for performing data model based analysis of data, in accordance with an embodiment. The system environment comprises an analysis system 100, one or more data source systems 110, one or more third party systems, and one or more client devices 130. The analysis system 100 obtains data and metadata from various data source systems 110 and data models from third party systems 120 and performs analysis of the data stored in the data source systems using the data models. The analysis system may present the analysis via a user interface of the client device 130. The details of the analysis system 100 are further described herein, for example, in FIG. 2.

The data source systems 110 store data, for example, data used by an organization or enterprise. A data source system 110 comprises instructions for processing data stored in the data source system 110 and one or more data sources 125. A data source 125 of the data source system 110 has a data source type, for example, a relational database, a file system, a document oriented database system, and so on. As a result, the system environment shown in FIG. 1 comprises the analysis system 100 connected to a plurality of heterogenous data sources, each data source possibly having a distinct data source type.

The analysis system 100 executes the instructions of the data source system 110, for example, by invoking the API (application programming interfaces) of the data source system 110 to access the data of the data source 125. For example, a data source system 110 may be a database management system such that the data source is a database. The analysis system 100 may execute API such as JDBC to access the data stored in a database management system. As another example, a data source system 110 may be a file system, for example, HDFS (HADOOP file system) and the data source refers to the files of the file system that store the data.

A particular type of data source may have multiple instances, for example, instances of relational databases. Different instances of a data source may be provided by different vendors. For example, the same organization may store data in relational databases including instances of ORACLE database, SQLSERVER, TERADATA, MYSQL, and so on. Other examples of data sources include data lakes, for example, data lakes offered by CLOUDERA; files stored in a distributed file system, for example, HDFS (HADOOP distributed file system; and cloud data warehouses. A data source may be stored in a cloud based system, for example, AWS (AMAZON web services), MICROSFT AZURE, and so on.

The third-party systems 120 provide additional information for example, data models to the analysis system. In an embodiment, a data model represents a virtual data model generated from questions received from users. The analysis system 100 may store the virtual data models generated from questions and use them for processing subsequent questions received from users. In an embodiment, a data model comprises entities and relations between entities. Each entity may comprise attributes (also referred to herein as fields). Each entity represents a set of records. A data model is associated with a set of questions that can be answered using the data model. The questions may be natural language questions or may be specified using a programming language. The questions can be translated into instructions for processing the question using the data model. For example, the instructions may use operations such as filtering, selecting fields, joining entities using relations and so on. The data model may specify data types of the fields. The data model may specify additional information describing the fields, for example, data format of the fields. For example, a field storing address information may be required to conform to certain data format used by standard addresses, a field storing date values may conform to certain date formats, and so on.

The client device 130 used by a user for interacting with the analysis system 100 can be a personal computer (PC), a desktop computer, a laptop computer, a notebook, a tablet PC executing an operating system, for example, a Microsoft Windows®-compatible operating system (OS), Apple OS X®, and/or a Linux distribution. In another embodiment, the client device 130 can be any device having computer functionality, such as a personal digital assistant (PDA), mobile telephone, smartphone, wearable device, etc. The client device 130 may be used by a user to view results of analysis performed or for providing instructions to the analysis system 100.

FIG. 1 and the other figures use like reference numerals to identify like elements. A letter after a reference numeral, such as "110(a)" indicates that the text refers specifically to the element having that particular reference numeral. A reference numeral in the text without a following letter, such as "110," refers to any or all of the elements in the figures bearing that reference numeral (e.g., "110" in the text refers to reference numerals "110(a)" and/or "110(n)" in the figures).

The interactions between the analysis system 100 and the other systems shown in FIG. 1 are typically performed via a network, for example, via the Internet. The network enables communications between the different systems. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network can also include links to other networks such as the Internet.

System Architecture

Figure 2:
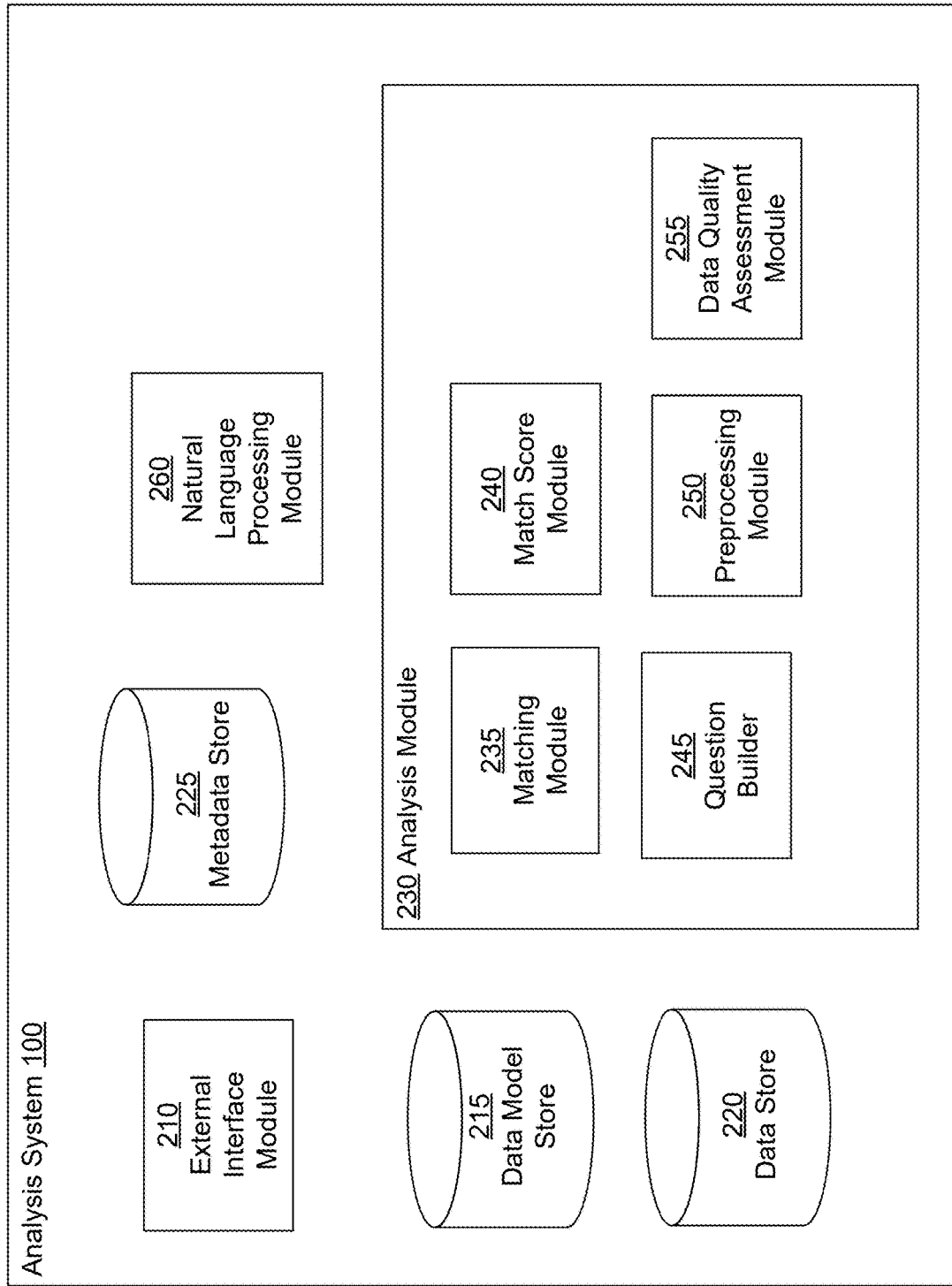
FIG. 2 is the system architecture of an analysis system for performing data model based analysis of data, in accordance with an embodiment.

FIG. 2 is the system architecture of an analysis system for performing data model based analysis of data, in accordance with an embodiment. The analysis system 100 includes an external interface module 210, a data model store 215, a data store 220, a metadata store 225, and an analysis module 230. Other embodiments may include fewer or more modules than those indicated herein. Functionality indicated herein as being performed by a particular module may be performed by other modules instead.

The external interface module 210 interfaces with external systems, for example, data source systems 110, third party systems 120, and client devices 130. In particular, the external interface module 210 receives connection parameters for connecting with external systems, for example, data source systems 110. The external interface module 210 establishes a connection with the data source system 110 to receive metadata or data from the data source system. The external interface module 210 stores metadata received from data source systems 110 in the metadata store 225 and data received from data source systems in data store 220. The external interface module 210 establishes connections with the third-party systems 120 to receive data models. The external interface module 210 stores data models received from third-party systems 120 in the data model store 215. The analysis module 230 also generates virtual data models from questions asked by users and stores them in the data model store 215.

The analysis module 230 comprises other modules including the matching module 235, match score module 240, question builder 245, pre-processing module 250, and a data quality assessment module 255. The actions performed by these modules and the processes executed by these modules are further described herein.

The matching module 235 matches the metadata describing the data stored in the data source systems 120 against questions, for example, using virtual data models generated form questions to determine whether the data source provides the required information.

The match score module 240 determines a match score for questions or data models matched against data of one or more data sources. The match score module 240 matches the table names/file names or names of collections of data of the data source to determine whether a question or data model matches data of the data source.

The question builder 245 allows users to ask natural language questions that the analysis system converts to query languages processed by systems, for example, SQL (structured query language). The question builder 245 receives requests from users to identify questions that can be answered using one or more data sources and performs the processing necessary to answer the questions.

The pre-processing module 250 determines quality of data that is available for answering a question or questions associated with a data model and determines whether pre-processing is required for improving the quality of the data. The pre-processing module 250 makes recommendations for portions of data that should be cleansed to improve the quality of the data to process a question.

The data quality assessment module 255 determines measures of data quality of data sources to improve matching accuracy. In an embodiment, the data quality assessment module 255 measures data quality based on analysis of values stored in a data source, for example, based on number of null values stored in a column, number of format errors in values stored in a column, and so on. The data quality assessment module 255 determines and provides metrics indicative of data quality to the match score module 240 and the match score module 240 uses the metrics received for determining match scores for data models or questions.

The different modules of the analysis system 100 may execute instructions in response to commands executed by a user via a user interface of the client device 130. For example, the analysis system 100 may present a user interface via a client device 130 that allows a user to interact with the analysis system 100 to identify various questions that can be answered using the data sources used by an organization and execute specific question.

System Architecture

Figure 3:
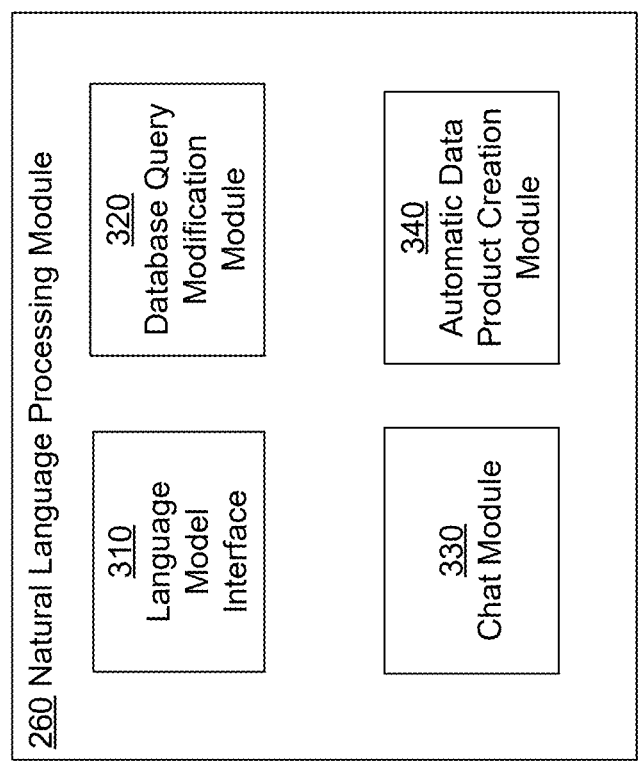
FIG. 3 illustrates a system architecture of the natural language processing module according to an embodiment.

FIG. 3 illustrates a system architecture of the natural language processing module according to an embodiment. The natural language processing module 260 comprises a language model interface 310, a database query modification module 320, a chat module 320, and a automatic data map creation module 340. Other embodiments may include more of fewer modules.

The language model interface 310, interacts with the language model. The language model may be part of the analysis system or may be an external system. If the language model is available as a service offered by an external system, the language model interface 310 interacts with the external system to execute the language model. For example, the language model interface 310 generates prompts describing the type of information needed from the language model and sends requests to the external system and receives response from the external system generated by executing the language model using the prompt. According to an embodiment, the language model interface 310 generates a prompt requesting the language model to generate a database query corresponding to a natural language question received from the user.

The database query modification module 320 processes the database query by modifying any generated data asset names used in the database query with actual data assets and generated field names of the database query using actual field names of fields of the selected data assets.

The chat module 330 provides a natural language based chat interface for allowing users to interact with the analysis system. For example, the user can use the chat interface provided by the chat module 330 to ask natural language questions. The chat module may further interact with the user by providing responses and asking for additional information using natural language.

The automatic data map creation module 340 automatically answers a natural language question by using an existing data map or by generating a new data map to answer the natural language question without requesting the user to provide additional information. Accordingly, after the user provides the natural language question, the analysis system provides the requested answer in a single-click, without requiring further interactions with the user.

The analysis system 100 may connect with different types of data sources including relational data management systems (RDBMS), HADOOP file system (HDFS), cloud based systems such as S3 file system, and so on. Each data source comprises data assets that represent smaller units of data storage, for example, tables in an RDBMS, or files in a file system. The analysis system 100 connects with various data sources and retrieves metadata describing the data in each data source without retrieving data stored in the data assets. Examples of metadata include various fields in a table or various columns in a file. For example, if a user table stores information describing specific users, the analysis system 100 retrieves metadata such as various fields of the table but does not retrieve records describing specific users. The analysis system 100 presents information describing data assets of a data source to the user via a user interface that allows the user to select specific fields for further analysis.

In some embodiments, the analysis system 100 stores a data catalog of a data source comprising metadata describing the data sources. The metadata stored by the analysis system 100 includes names, tags, and synonyms describing the data source. A synonym refers to a new name defined for a data asset, for example, an alias.

The analysis system 100 performs search across multiple data sources and identifies any data asset that matches the search request including tables, columns, files, and so on. The user interface provides the file/table/column name, a vendor name for the data source, a system name for the data source, a data type for the data asset, and location (URL) of the data source.

The analysis system 100 also stores information describing how a particular data asset is being used by other users. The analysis system 100 stores information describing associated questions for each data asset. The associated questions may represent questions that were asked by other users for which this data asset was returned. The analysis system stores these questions and associated execution plans and virtual data models. An associated question is also referred to herein as a stored question since the question was previously asked by user and is stored by the analysis system.

In an embodiment, the analysis system 100 tracks the search results that a user accessed to identify questions associated with a data asset. For example, if a data asset is returned as a result of a natural language question and the user accesses the data asset returned in response to the question, the analysis system associates that question with the data asset. Similarly, if a data asset is returned as a result of a natural language question and no user accesses the data asset returned in response to the question, the analysis system does not associate that question with the data asset.

In an embodiment, the analysis system stores weights with each association between a data asset and a question. For example, the weight of an associated question for a data asset may depend on the frequency with which a data asset is accessed by users in response to the question. The weight of an associated question for a data asset may depend on the amount of time that the data asset is accessed by users in response to the question. The higher the frequency with which a data asset is accessed in response to a question, the higher the weight of the association between the question and the data asset as determined by the analysis system 100. Similarly the higher the amount of time that a data asset is used by users, for example, for processing or for viewing information describing the data asset in a user interface, the higher the weight of the association between the question and the data asset as determined by the analysis system 100.

In an embodiment, the analysis system 100 builds a virtual data model representing a question. The virtual data model may comprise one or more entities and relations between the entities. The analysis system 100 further generates instructions representing directions to the various systems for accessing the required data assets from their corresponding data source to be able to answer the question. The instructions may specify how the various data assets should be combined to generate the result, for example, whether two tables should be joined, what columns to use for joining and the type of join (inner join, left outer join, right outer join, etc.)

The analysis system 100 may rank the data assets based on their relevance and select a data asset by default. However, a user interface allows the user to change the selected data asset and use a different data asset for that entity. The analysis system 100 uses any modified data assets for answering the question received from the user.

Process for Accessing Data from Heterogeneous Data Sources

Figure 4:
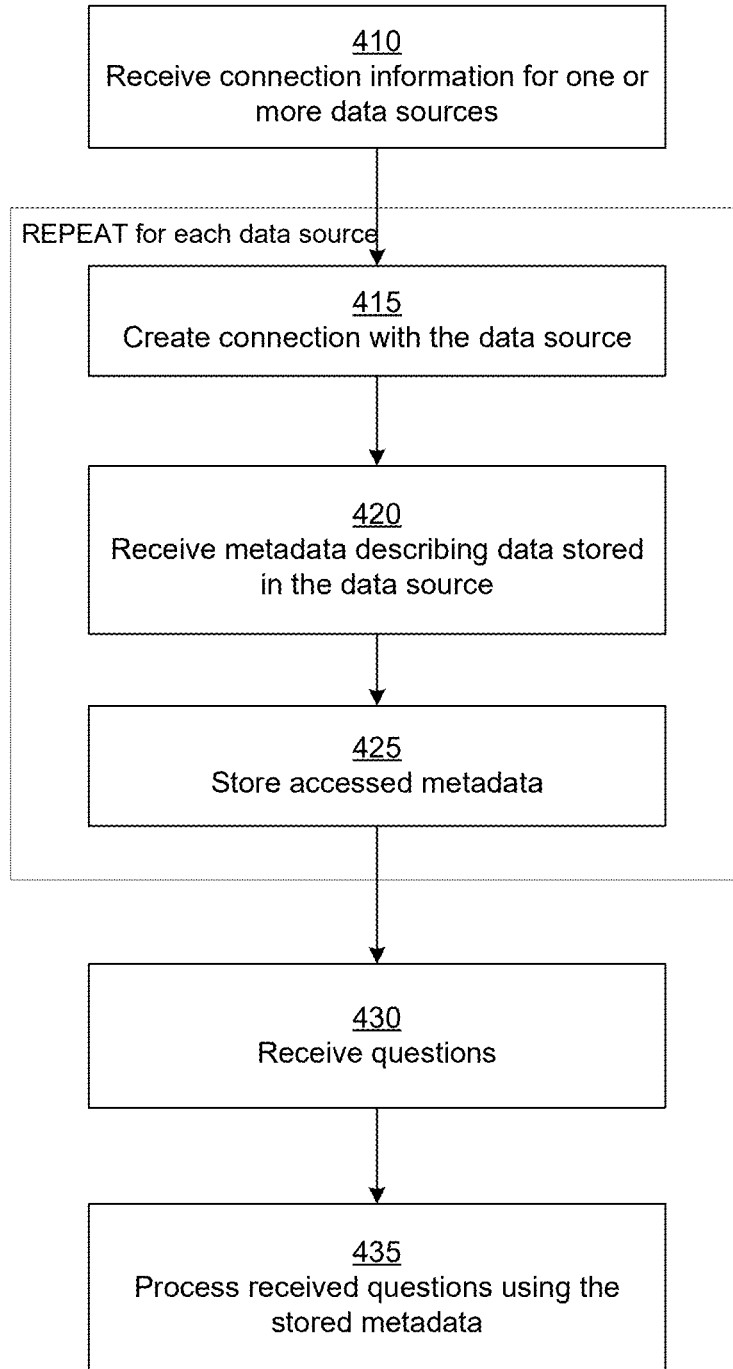
FIG. 4 is the overall process of collecting data used by the analysis system, in accordance with an embodiment.

FIG. 4 is the overall process of collecting data used by the analysis system, in accordance with an embodiment. The analysis system 100 interacts with a plurality of heterogeneous data sources for processing questions. The analysis system 100 receives 410 connection information for one or more data sources. The connection information may include an address and port number for establishing a connection with a data source system 110. The connection information may also include login information, for example, user name and password for connecting to a data source system.

The analysis system 100 repeats the steps 415, 420, and 425, for each data source. The analysis system 100 creates 415 a connection with the data source system 110. The analysis system 100 receives 420 metadata describing the data stored in the data source 125 of the data source system 110 using the connection created with the data source system 110. The analysis system 100 stores 425 the accessed metadata in the metadata store 225.

In an embodiment, the analysis system identifies what data matched and what did not match across table names, file names, field names, and metadata values. The analysis system uses metadata to create a dynamic mapping to an entity relationship diagram based off of the data model that represents a live view of the data sources. The analysis system creates step-by-step directions of how to find the data, how to access the data and assemble the data to construct the data model.

The metadata received by the analysis system 100 may include names of tables, files, or any named unit of data storage of the data source. The named units of data storage store collections of records or rows of data. The metadata further comprises fields for each table. A field of a table may also be referred to as a column of the table. The metadata may further comprise information describing the data source, for example, data types of each field, statistics describing the table (e.g., size of the table), and so on. In an embodiment, the analysis system 100 accesses samples of data from each table or file to extract additional information describing the data.

The analysis system 100 receives questions, for example, natural language questions from users. The analysis system 100 processes the questions using the metadata obtained from the data sources. In an embodiment, the analysis system receives one or more data models from one or more third party systems and stores the accessed data models in the data model store 215. In an embodiment, the analysis system 100 generates virtual data models based on the received questions and stores the virtual data models in connection with the question corresponding to the virtual data model. The analysis system 100 may compare a new question received from a user against the stored data models including stored virtual data models of previous questions to determine if any of the stored data model either answers the new question or provides at least a portion of answer to the new question, for example, a partial result that can be further processed to answer the question.

According to an embodiment, the analysis system 100 receives a question, for example, a natural language question. The analysis system 100 may generate a virtual data model for the natural language question, wherein the virtual data model comprises one or more entities and optionally relationships between entities. The analysis system 100 parses the questions to identify keywords that are likely to correspond to entities. The analysis system 100 may determine that keywords that represents objects in the natural language sentences, for example, subject and predicate are likely to match entities in a data model. The analysis system 100 matches these keywords in the question with data assets of various data sources.

The analysis system 100 identifies data assets matching the keyword K1 and determines a score for each matching data asset. For example, if the keyword is "employee", the analysis system 100 may associate the keyword with an entity Employee and identifies data assets that store employee data. The analysis system 100 may identify data assets corresponding to the keyword, for example, by matching the keyword based on matching of the name of the data asset, for example, name of the table or file name. The analysis system 100 may identify data assets matching the entity corresponding to the keyword or matching the keyword based on matching of the metadata, for example, description of the data asset. The analysis system 100 may identify matching data assets based on matching of the data stored in the data asset, for example, the format of the data. For example, the format of data may be used to determine that a column stores addresses or social security numbers, and so on.

The analysis system 100 determines a match score for the matching data asset. The match score may be referred to as a score or as a relevance score for the data asset in relation to the received question. The analysis system 100 determines the match score for each data set in relation to a received question based on several criteria. The analysis system 100 determines a match score for a data asset based on the aggregate number of distinct questions previously asked that matched the data asset and are stored in connection with the data asset. Accordingly, the match score for a data asset is directly proportional to the number of distinct questions previously asked that matched the data asset. In an embodiment, the analysis system 100 determines a match score for a data asset based on a weighted aggregate of the previously asked questions that matched the data asset, wherein the weight depends on a match score for the previously asked question. The weight may be based on a degree of match between the previously asked question matched the received question indicating closely the previously asked question matches the received question.

In an embodiment, the match score of a data asset is weighted based on the amount of data stored in the data asset. For example, a data asset that has large amount of data is weighted higher than a data asset that has less data. The two data assets may be from two different data sources. The match score for a data asset may be weighted based on the number of times the data asset is accessed, e.g., directly related to a frequency of access of the data asset. Accordingly, the match score for the data asset is weighted high if the data asset is frequently accessed by users. In an embodiment, the match score for a data asset is determined based on a number of times the data asset is accessed after being presented as a result in response to a previously asked question. Accordingly, the analysis system 100 determines a match score to be a value that is directly related to the frequency of access of the data asset after being presented as a result in response to a previously asked question. The analysis system 100 may determines a match score for a data asset as a weighted aggregate over all previously asked questions associated with the data asset, wherein each previously asked question is weighted based on the frequency of access of the data asset in response to being presented as a result for that question.

In an embodiment, the analysis system determines a quality score for a data asset. The quality score may be obtained from the data source or determined by the analysis system by accessing a sample of data of the data asset from the data source. The quality score of a data asset may be directly related to the number of null values in the data asset or a number of values that have formatting errors. A formatting error may be present if the data is expected to conform a to some format rule but fails to conform. For example, values of a column of a table may be expected to satisfy a regular expression or another syntax but fail to conform. The quality score of a data asset is indicative of low quality if the percentage of data values in the data asset that are null or have format errors is greater than a threshold value.

The analysis system 100 ranks the data assets matching a particular keyword based on their match score. The analysis system 100 presents the ranked list of matching data assets for each keyword via a user interface. The analysis system 100 may select a subset of matching data assets based on the score for presenting. The analysis system 100 may select a default data asset to be used for each keyword, for example, the data asset with the highest score. The analysis system 100 presents a user interface to the user that allows the user to select a specific data asset to be used for each keyword. Accordingly, the analysis system 100 may receive a user selection of a data asset that may be different from the data asset selected by the analysis system based on the score. The analysis system 100 determines an execution plan for the question based on the selections of data assets.

Processing Natural Language Questions Based on Data Stored in Heterogeneous Data Sources Embodiments allow a user to ask natural language questions and answer the natural language questions by identifying specific data that is required to answer the question, identifying a subset of a plurality of data sources that provide the required data without actually fetching the data from the sources, generating instructions (e.g., statements, queries, or commands) to process combine the data, and executing the instructions. The plurality of data sources may include data sources having different architectures, for example, relational database management system (e.g., ORACLE or DB2), cloud based system (e.g., Amazon Web Services or AWS), and parallel database systems (e.g., TERADATA).

Figure 5:
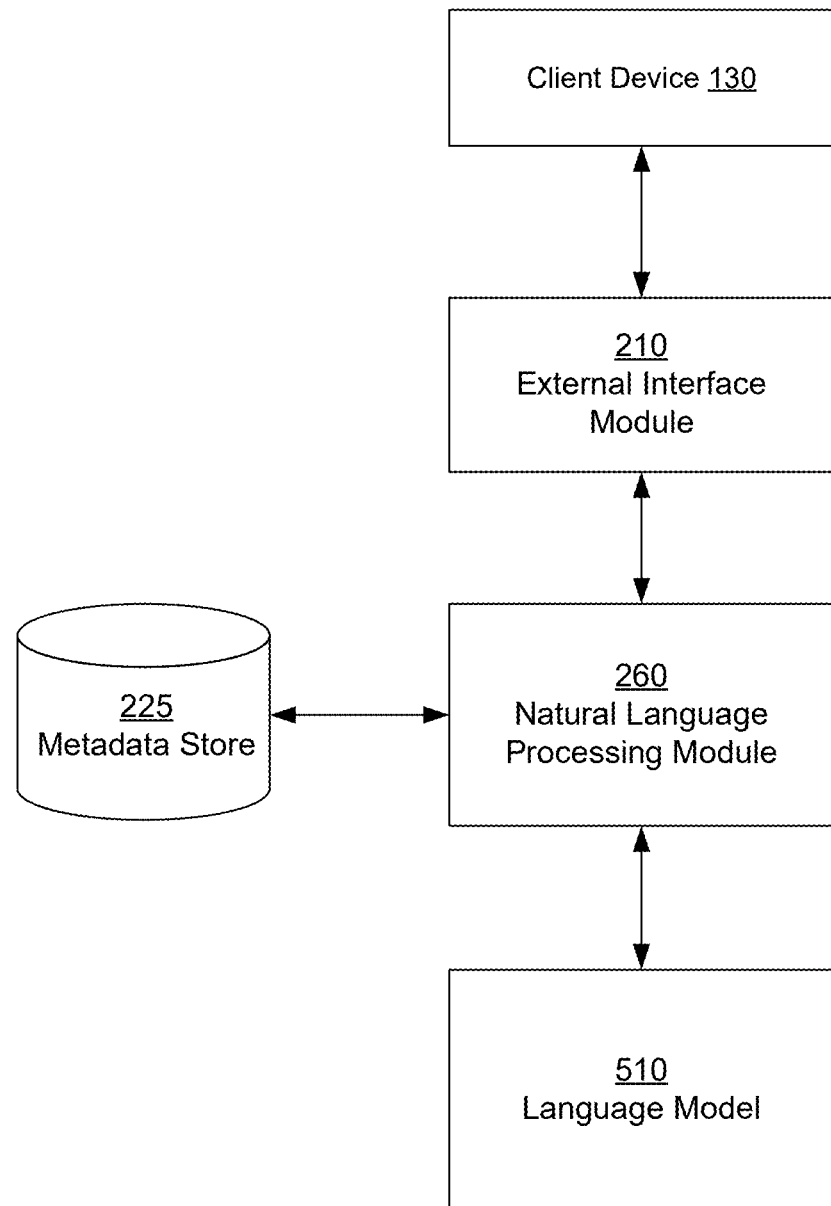
FIG. 5 illustrates interactions between various components for processing a natural language question, according to one or more embodiments.

FIG. 5 illustrates interactions between various components for processing a natural language question, according to one or more embodiments. The client device 130 presents a user interface that allows a user to input a natural language question. For example, the user interface may be a chat interface that allows users to interact with the analysis system using natural language questions and provides natural language answers based on data stored in data assets that may be stored in one or more data sources. The analysis system may have access to multiple data assets that may have same name or similar fields. The analysis system identifies the appropriate data assets that is suitable for answering the natural language question.

According to an embodiment, the external interface module 210 configures the user interface, for example, the chat interface and presents it via the client device 130. The external interface module 210 facilitates the interactions between the user interface presented via the client device 130 and the natural language processing module 260. The natural language processing module 260 has access to the metadata store 225 and uses the metadata to identify appropriate data assets for answering a particular natural language question.

The natural language processing module 260 interacts with the language model 510 to generate a database query based on a natural language question received. The language model 510 may also be referred to herein as a machine learning based language model or a machine learned language model. According to an embodiment, the language model 510 is a large language model, for example, a deep learning based neural network that can perform a variety of natural language processing (NLP) tasks.

According to an embodiment, the language model 510 receives natural language processing (NLP) tasks, audio processing tasks, image processing tasks, video processing tasks, and the like. The NLP tasks include, but are not limited to, text generation, query processing, machine translation, chatbots, and the like. In one embodiment, the language model is configured as a transformer neural network architecture. Specifically, the transformer model is coupled to receive sequential data tokenized into a sequence of input tokens and generates a sequence of output tokens depending on the task to be performed.

In one embodiment, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by analysis system or one or more entities different from the analysis system. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In one embodiment, when the language model 510 is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

According to an embodiment, the language model 510 is executing in an external system and the natural language processing module 260 interacts with the language model 510 using APIs (application programming interfaces) of the language model 510. The APIs of the language model 510 may be invoked remotely, for example, by sending a prompt to the language model language model 510 over the network and receiving the response of the language model 510 over the network.

Figure 6A:
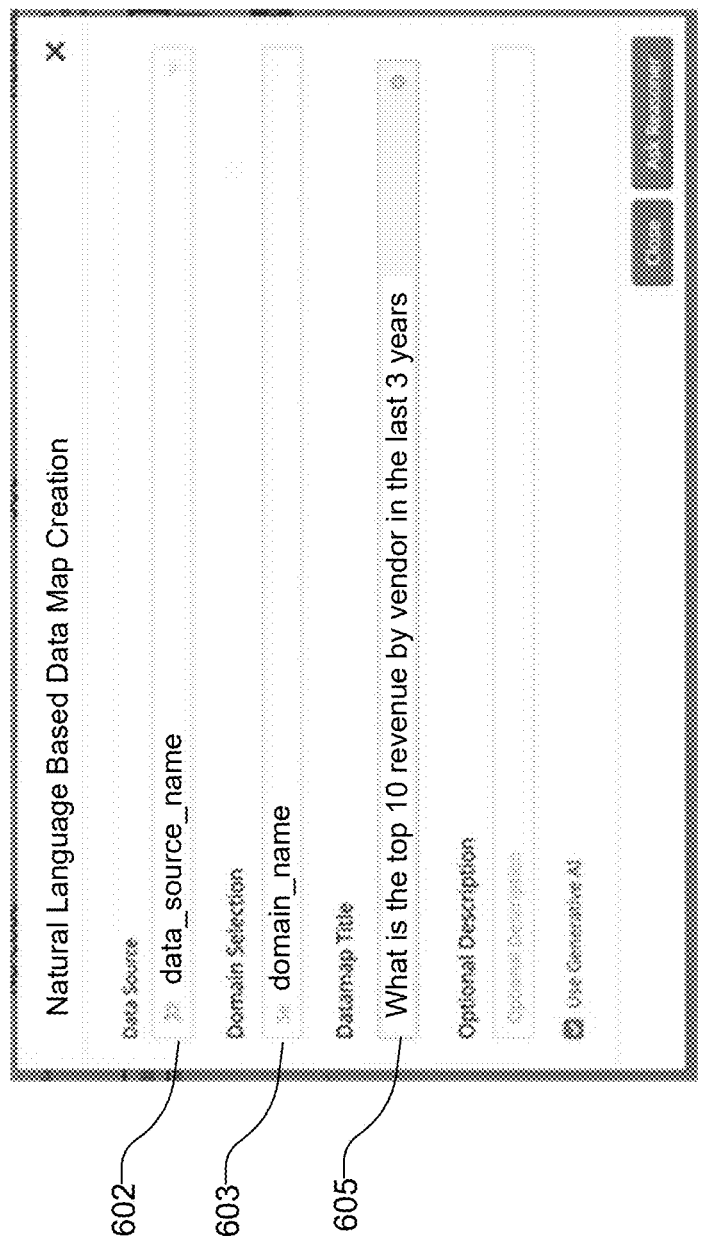
FIG. 6A shows a screenshot of a user interface for receiving a natural language question from a user via a client device, according to an embodiment.

FIG. 6A shows a screenshot of a user interface for receiving a natural language question from a user via a client device, according to an embodiment. The user interface allows the user to specify the natural language question 605 using a widget that allows users to enter free text. The user interface also allows uses to optionally input a domain name 603 that allows the search for data assets to be restricted to a subset of all the data assets accessible to the analysis system. For example, the analysis system may group data assets into a set of domains. A domain may be associated with a type of use case, for example, particular project or a particular stage of a project. The user interface further allows users to optionally specify one or more data source names 602.

Figure 6B:
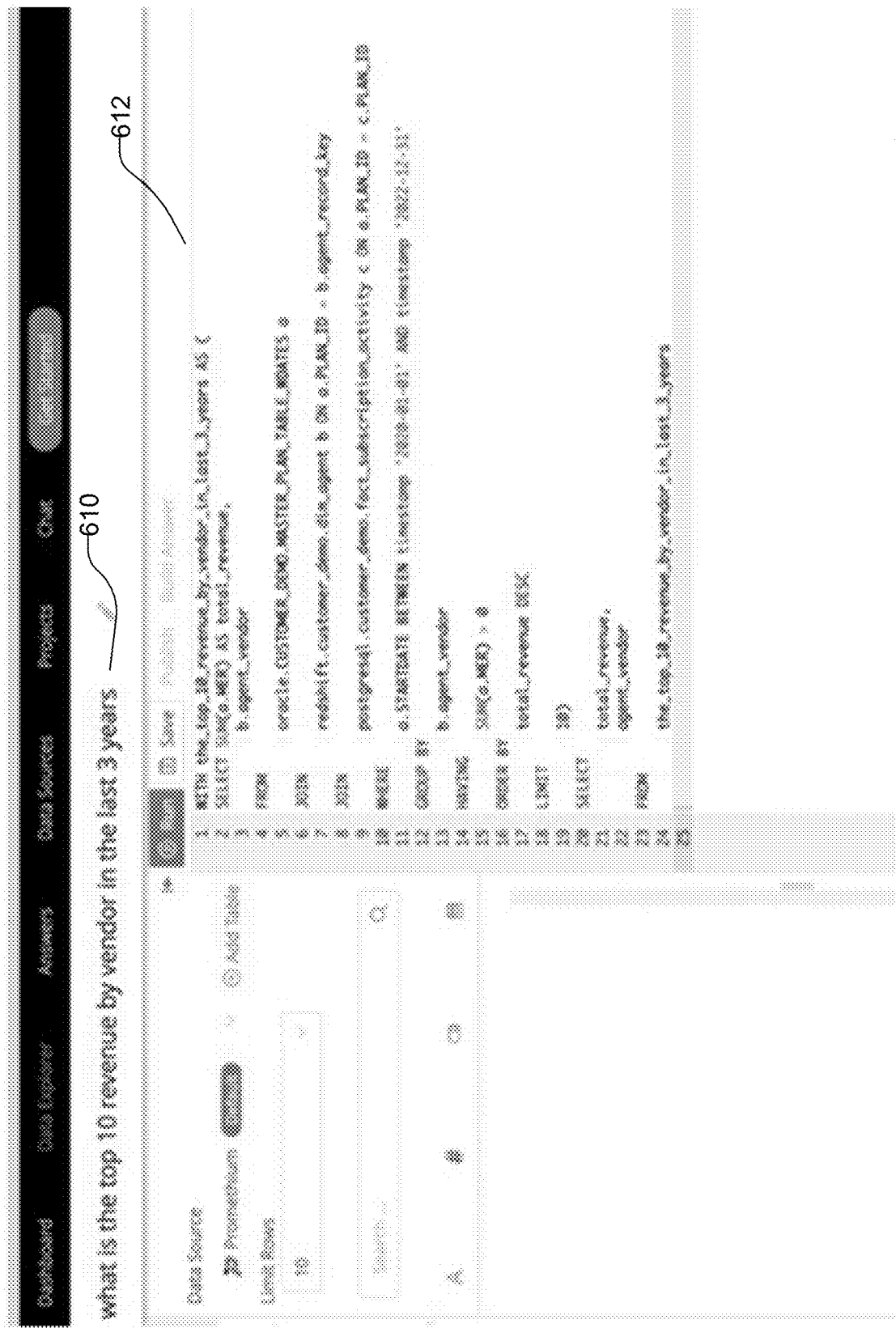
FIG. 6B shows a screenshot of a user interface displaying a generated database query to a user via a client device, according to an embodiment.

FIG. 6B shows a screenshot of a user interface displaying a generated database query to a user via a client device, according to an embodiment. The user interface may display the natural language question 610 for which the database query 612 was generated. The database query may include one or more clauses including a SELECT clause for identifying fields or expressions based on fields for returning as results, a FROM clause identifying data asset names for data assets used by the database query, a JOIN clause for identifying one or more data asset names of data assets joined for determining the results of the database query, a GROUP BY clause for specifying one or more fields for grouping the records, an ORDER BY clause for specifying criteria for ordering the results of the database query, and a HAVING clause. The database query generated by the language model 510 uses data asset names and field names that are generated and may not correspond to any actual data asset or field respectively that exists in any of the data sources. For example, the database query uses a schema name CUSTOMER_DEMO and a table name MASTER_PLAN_TABLE_WDATES. The schema CUSTOMER_DEMO may not exist in any know data source and the table name MASTER_PLAN_TABLE_WDATES may not exist in any schema. Alternatively, several data sources may include schema CUSTOMER_DEMO and multiple schemas named CUSTOMER_DEMO may include a table MASTER_PLAN_TABLE_WDATES. The analysis system identifies matching data assets and also corresponding field names and may display them to the user to select a particular data asset and/or corresponding field corresponding to the generated data asset name/field name. According to an embodiment, the data asset names and field names are generated by the language model via hallucination since these may or may not exist in the data sources.

Figure 6C:
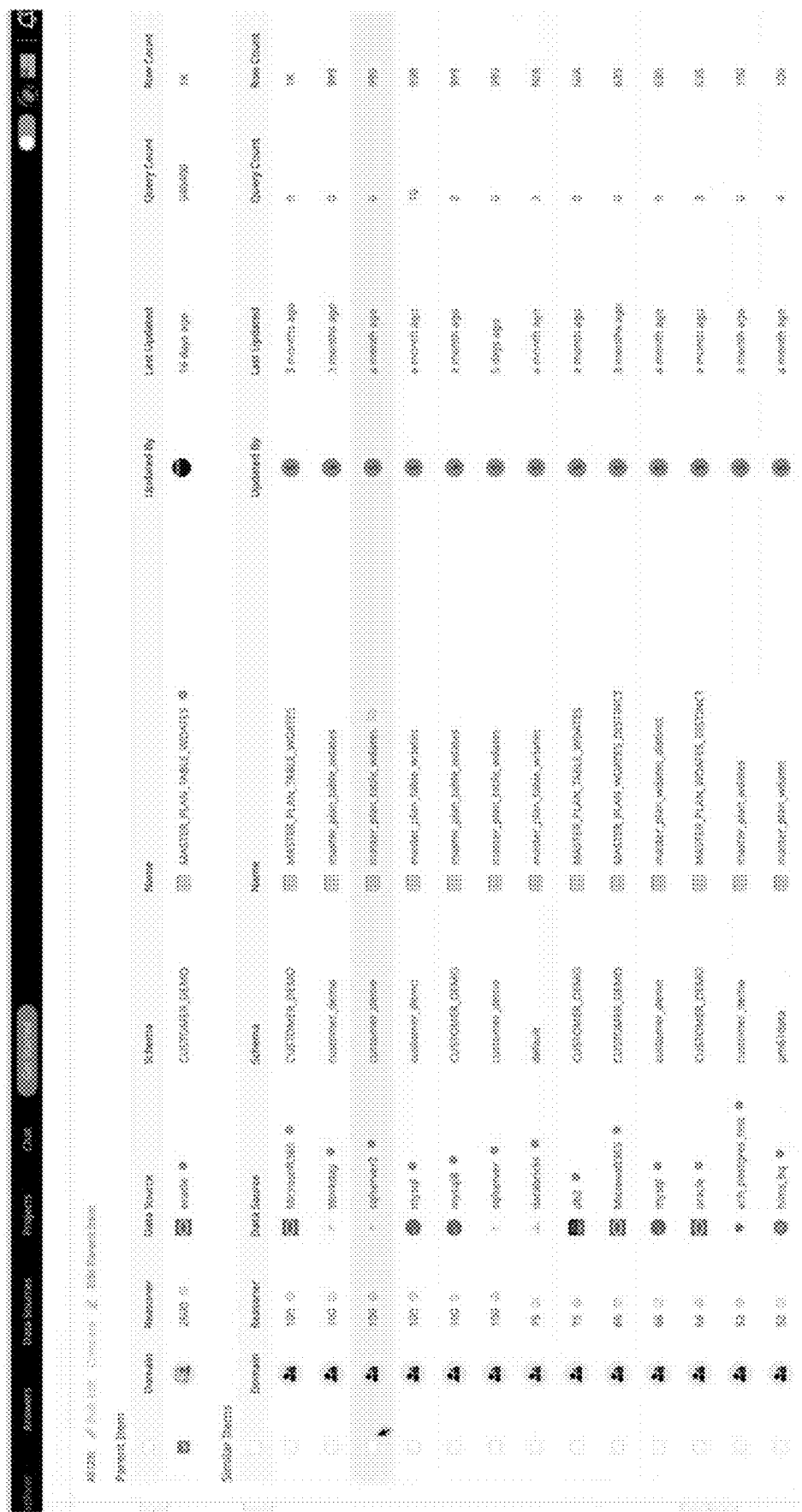
FIG. 6C shows a screenshot of a user interface displaying various data assets matching a particular generated data asset name, according to an embodiment.

FIG. 6C shows a screenshot of a user interface displaying various data assets matching a particular generated data asset name, according to an embodiment. For example, several data sources include schema named CUSTOMER_DEMO that also include a table named MASTER- _PLAN_TABLE_WDATES. The analysis system may also display schemas and tables that do not have an exact match with the generated data asset name but only an approximate match. For example, the analysis system displays tables with names MASTER_PLAN_WDATES_DISTINCT, MASTER_PLAN_WDATES, MASTER_PAN_TABLE_WDATES, and so on as matching the generated data asset name MASTER_PLAN_TABLE_WDATES. For example, the analysis system may split the generated asset name and the table/schema names into tokens separated by separator strings such as underscore character, hyphen character, or white space characters, and matches the individual tokens. A table name or schema name is determined to match a generated data asset name if more than a threshold number (or percentage) of tokens of the table name/schema name match the tokens obtained from the generated asset name.

Figure 6D:
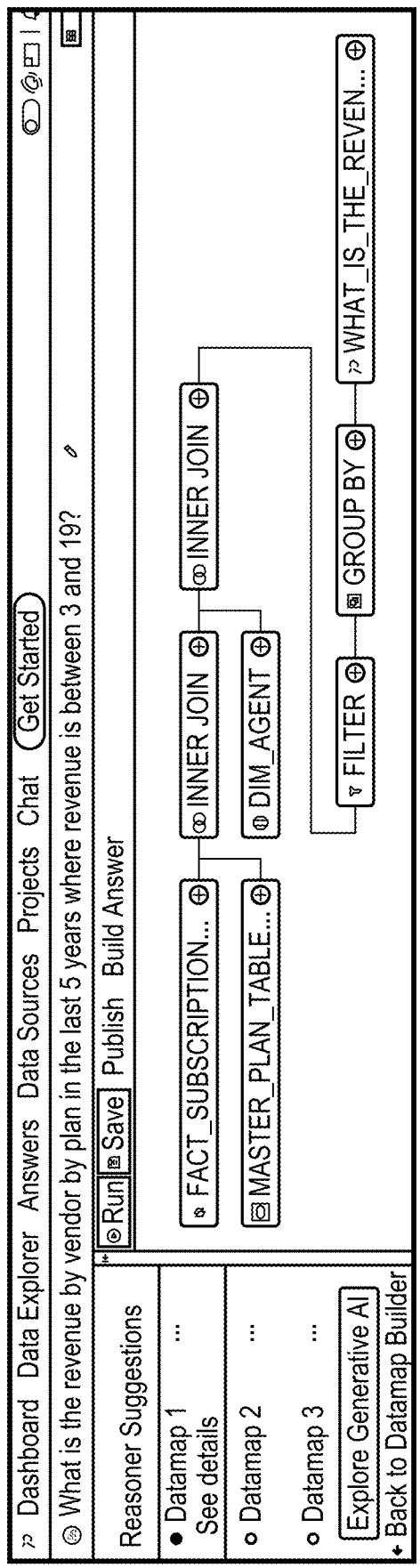
FIG. 6D shows a screenshot of a user interface displaying the query plan of the final query that is executed by the analysis system, according to an embodiment.

FIG. 6D shows a screenshot of a user interface displaying the query plan of the final query that is executed by the analysis system, according to an embodiment. The analysis system modifies the database query by replacing generated data asset names with names of actual assets stored in data sources and by replacing generated fields names with names of fields of actual assets stored in the data sources. The analysis system compiles the modified database query to generate a query plan, for example, the query plan illustrated in FIG. 6D and executes the query plan.

Figure 7:
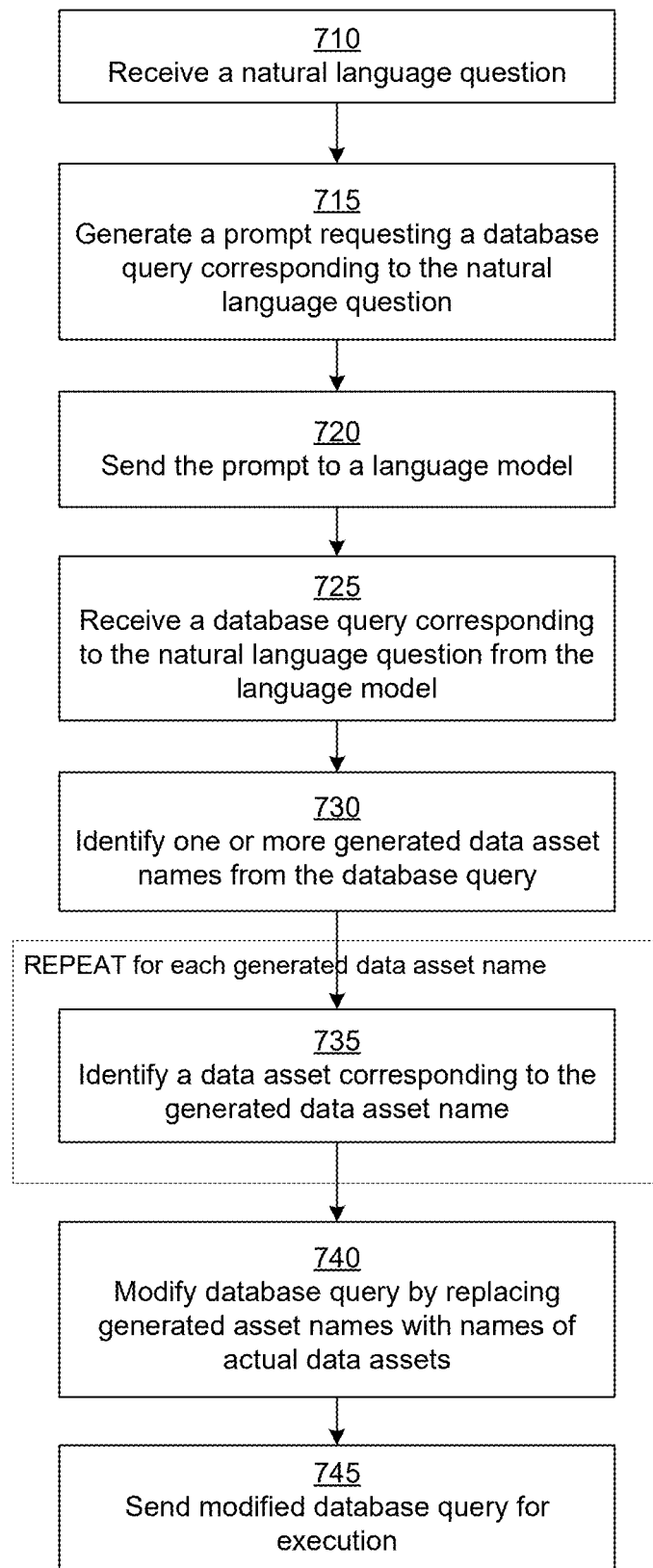
FIG. 7 shows a flowchart illustrating a process of answering natural language questions based on data stored in heterogeneous data sources, according to one or more embodiments.

FIG. 7 shows a flowchart illustrating a process of answering natural language questions based on data stored in heterogeneous data sources, according to one or more embodiments. The steps shown in the flowchart may be performed in an order different from that indicated in the figure. For example, certain steps may be executed in parallel.

The natural language processing module 260 receives 710 a natural language question based on data stored in heterogeneous data sources from a client device 130. According to an embodiment, the natural language question is a request for information without any indication of which data sources to use for the data. The information may be stored in one of the data sources or distributed across multiple data sources.

The natural language processing module 260 generates 715 a prompt for the language model 510. The prompt requests a database query using syntax of a database query language (for example, SQL (structured query language)) that corresponds to the natural language question. According to an embodiment, the prompt does not provide any information describing the data assets that could be used for answering the natural language question. For example, the prompt does not include any database schema information describing the tables, columns, and their relations. For example, if the user asks a natural language question Q, the prompt may request "generate a database query using SQL for answering the question Q."

The natural language processing module 260 sends 720 the prompt to the language model 510 for execution. The language model 510 processes the prompt to generate a database query (for example, an SQL query) that corresponds to the natural language question.

The natural language processing module 260 receives 725 a response from the language model 510. The response includes a database query using syntax of a database query language generated by language model 510. According to an embodiment, the natural language processing module 260 sends a prompt to the language model 510 that does not include any information describing the database schema or the data assets to use for generating the database query. As a result, the database query generated by the language model 510 includes data asset names and names of fields of the data assets that are generated by the language model and do not correspond to any actual data asset that is accessible to the natural language processing module 260.

The natural language processing module 260 parses the generated database query to identify 730 various components of the database query, for example, clauses such as select clause, where clause, group by clause, having clause, join clause, and so on. The natural language processing module 260 identifies various data asset names and corresponding field names used in the database query that were generated by the language model 510.

For each of the one or more generated data asset names the natural language processing module 260 identifies 735 a data asset corresponding to the generated data asset name based on metadata describing the data asset.

The natural language processing module 260 modifies 740 the database query by replacing each of the one or more generated data asset names by a name of the data asset corresponding to the generated data asset name. Accordingly, the natural language processing module 260 modifies the database query received from the language model 510 to obtain a modified database query that uses actual names of data assets and fields of data assets that are available in one or more data sources.

The natural language processing module 260 sends 745 the modified database query for execution, for example, by the analysis module 230. The analysis system may send the query to specific data sources for processing, without fetching the data to the analysis system. Accordingly, the user is directed to the data source to access the result. This way the data is not moved outside the individual data sources. This preserves privacy of data stored at each data source and ensures data isolation. For example, if a data source stores data that violates certain policies, for example, GDPR (General Data Protection Regulation) policies, that data is not mixed with data obtained from other data sources. This avoids polluting the data obtained from other data sources.

According to an embodiment, the analysis system federates queries across multiple data sources with the data remaining in each data source. The analysis system performs data isolation so as to avoid retrieving data that may violate certain polices and combining it with other data that does not violate such policies. The data isolation ensures that the data that does not violate policies is kept separate from the data that violates policies. If the analysis system is required to combine such data, the analysis system tracks lineage of the data so that, if necessary, data that violates certain policies can be identified and replaced with equivalent data from another data source that does not violate these policies.

According to an embodiment, the natural language processing module 260 matches information describing a generated data asset name with metadata describing various data assets stored in one or more data sources. The natural language processing module 260 may rank various matching data assets corresponding to the generated data asset name. The natural language processing module 260 may present the matching data assets to a user to receive a user selection of the appropriate data asset. Alternatively, the natural language processing module 260 may use the data relevance score of the data assets to select the closest matching data asset for each generated data asset name.

Once a data asset is matched against a generated data asset name, the natural language processing module 260 matches fields of the matching data asset against generated field names based on the generated data asset name. The natural language processing module 260 may rank fields of the matching data asset using a data relevance score determined with respect to the information describing the generated field name. The natural language processing module 260 may present the matching fields to a user to receive a user selection of the appropriate field that the user determines as matching the generated field name. Alternatively, the natural language processing module 260 may use the data relevance score of the data assets to select the closest matching field for each generated field of the corresponding generated data asset name.

The information describing a generated data asset name used to determine the data relevance score for various data assets includes the name of the generated data asset name as well as the context in which the generated data asset name is used within the generated database query, for example, the specific clause of the generated database query. Similarly, the information describing a generated field name used to determine the data relevance score for various fields includes the name of the generated field name as well as the context in which the generated field name is used within the generated database query, for example, the specific clause of the generated database query. Certain data assets and fields are determined to be more likely to be used in specific clauses of a database query. For example, certain fields are determined to be more likely to be used in a where clause, some fields are more likely to be used in a group by clause, some fields are more likely to be used in a select by clause, and some fields are more likely to be used in a join clause. For example, a column of a database representing a primary key or a foreign key is more likely to be used in a join clause. A column with a low cardinality of data is more likely to be used in a group by clause. A date column is more likely to be used in a where clause.

According to an embodiment, the natural language processing module 260 performs type inferencing using the context in which a generated field name is used to determine a type of the field corresponding to the generated field name. For example, if a generated field name is used in an expression, for example, in a where clause, the natural language processing module 260 analyzes the usage of the generated field name within the expression to determine the type of the field corresponding to the generated field name. For example, if a generated field name f1 of a generated data asset name D1 occurs in an expression that compares D1·f1 to date values, for example, an expression, "D1·f1 within date1 and date2," the natural language processing module 260 infers that D1·f1 is a date type. The natural language processing module 260 uses the inferred type of a field name to determine data relevance score of various fields of a data asset. Similarly, the natural language processing module 260 uses the inferred types of generated field names corresponding to a generated data asset name as information describing the generated field name for determining data relevance score for data assets matching the generated data asset name. For example, if a generated data asset name D1 has three generated field names f1, f2, and f3 that are used in the generated database query, the natural language processing module 260 assigns higher data relevance score to data assets having matching data fields compared to other data assets lacking such fields. According to an embodiment, the data relevance score of a data asset for a generated data asset name includes a factor determined by aggregating data relevance scores of fields determined to match generated data fields corresponding to the generated data asset name. The generated data fields may be the fields of the generated data asset name used in the generated database query. Alternatively, the natural language processing module 260 may generate a prompt asking the language model 510 to list fields names of a data asset corresponding to a generated data asset name of the generated database query and use the field names determined by the language model 510.

According to an embodiment, the natural language processing module 260 generates a prompt for the language model 510 requesting additional information for generated data asset names and generated field names, sends the prompt the language model 510 and obtains additional information from the language model 510. The additional information is used fort determining data relevance scores of data assets matching a generated data asset name and for determining data relevance scores of fields of a data asset matching a generated field name. The natural language processing module 260 may generate a prompt for a generated data asset name D1 in a generated database query Q1 such as "describe the data asset D1 of the database query Q1." The natural language processing module 260 may request specific information for the generated data asset name D1 such as "describe various fields of the data asset D1 used in the database query Q1" or "describe the schema of the data asset D1 used in the database query Q1." Similarly, the natural language processing module 260 may use a prompt for a field f1 of a generated data asset name D1 in a generated database query Q1 as "describe the data field D1·f1 of the database query Q1." The natural language processing module 260 may request specific information for the generated data asset name D1 such as "describe a type of the data field D1·f1 used in the database query Q1." The natural language processing module 260 may request sample data of a data asset corresponding to a generated data asset name or a data field corresponding to a generated field name, for example, "generate sample data for the data asset D1 of the database query Q1" or "generate sample data for the data field D1·f1 of the database query Q1" respectively. The natural language processing module 260 uses the sample data to infer additional information corresponding to the generated data asset name for use in determining the data relevance score for matching data assets for ranking them. The natural language processing module 260 uses the sample data of a generated data field name to infer additional information corresponding to the generated field name for use in determining the data relevance score for matching data fields for ranking them.

According to an embodiment, the analysis system determines one or more reasons behind selecting a particular data asset or a data field for answering a natural language question. The analysis system determines values corresponding to various factors for determining a data relevance score and determines a weighted aggregate of the values as the data relevance score for the data asset. Examples of factors include, a degree of match between the name of the data asset and the name for the data asset generated by the language model; a degree of match between the field names of the data asset and the field names generated by the language model for the corresponding generated data asset name; whether the data asset was endorsed, a degree of match between the description of the data asset and a description generated by the language model, and so on. According to an embodiment, the reasons are determined based on the values of the dominating factors that determine the data relevance score for the data asset. According to an embodiment, the analysis system stores threshold values or ranges associated with each factor used to determine the data relevance score of data assets with respect to a natural language question. The analysis system compares the actual values corresponding to each factor for a particular data asset with the corresponding threshold value to determine whether the factor is a dominating factor for determining the data relevance score value of the data asset. If the analysis system determines based on the comparison that the factor is a dominating factor, the analysis system identifies that factor as a significant reason for determining that the data asset is relevant for answering the natural language question. According to another embodiment, the analysis system lists values corresponding to all factors used to determine the data relevance score of the data asset so that the user can determine why the data asset was selected as being relevant for answering the natural language question.

FIG. 8A is the screenshot of a user interface displaying a reason determined by the analysis system for selecting a data asset, according to an embodiment. The user interface displays a table displaying various factors for determining why a data asset was considered relevant to a natural language question, for example, a clause of the database query in which the data asset was used, whether the data asset name matched the data asset name generated by the language model, the metadata tags associated with the data asset that matched the natural language question, field names of the data asset that matched field names used in the data base query generated by the language model corresponding to the natural language question, tags or terms in the description of the data asset that matched the entities relevant to the natural language question, whether the data asset was endorsed by an authorized user, and so on.

Figure 8B:
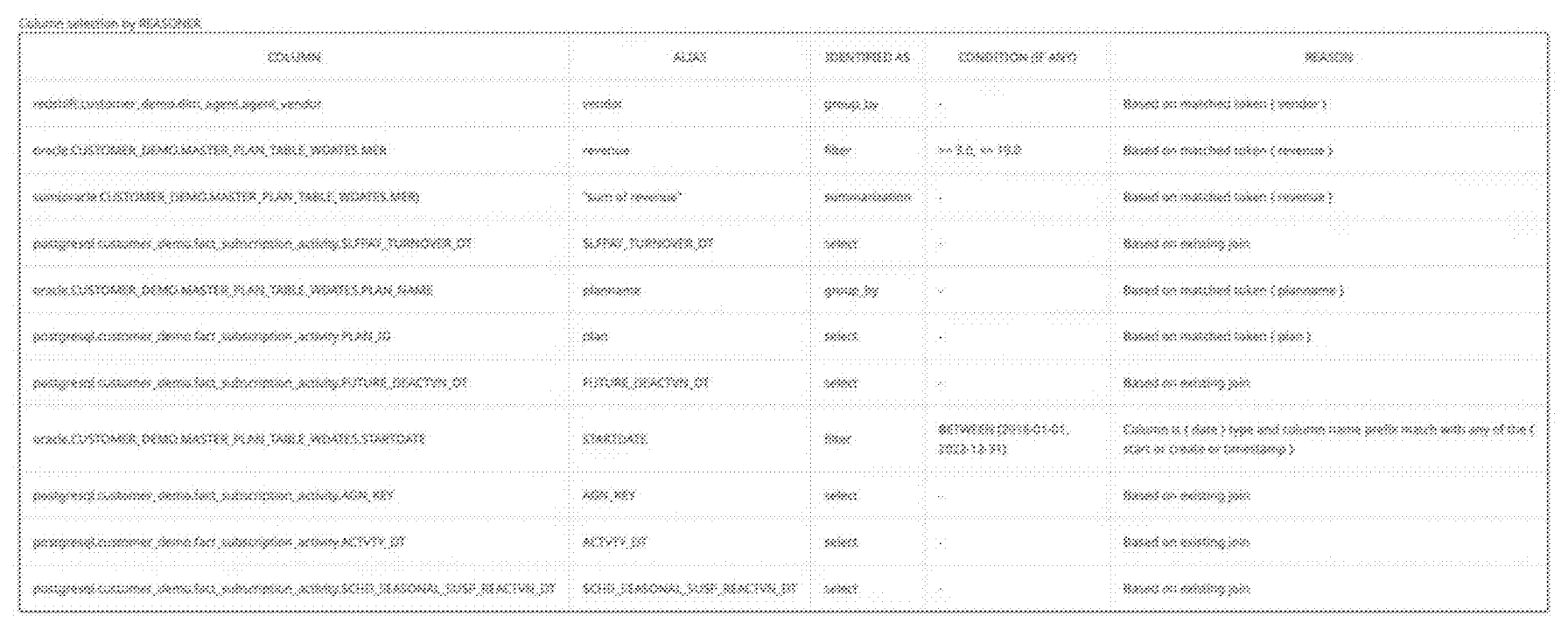

FIG. 8B is the screenshot of a user interface displaying a reason determined by the analysis system for selecting a field of a data asset, according to an embodiment. The user interface displays a table displaying various factors associated with a field used for determining why that field of the data asset was considered relevant to a natural language question. These include the clause of the database query generate by the language model for the natural language question in which the field is used, a match of the field name with an alias generated for the field by the language model, an expression or a condition in which the field was used, for example, a condition within a where clause, and so on. The analysis system identifies one or more factors that were associated with values that had a significant contribution to determining the value of the data relevance score of the field with respect to the natural language question.

Figure 8C:
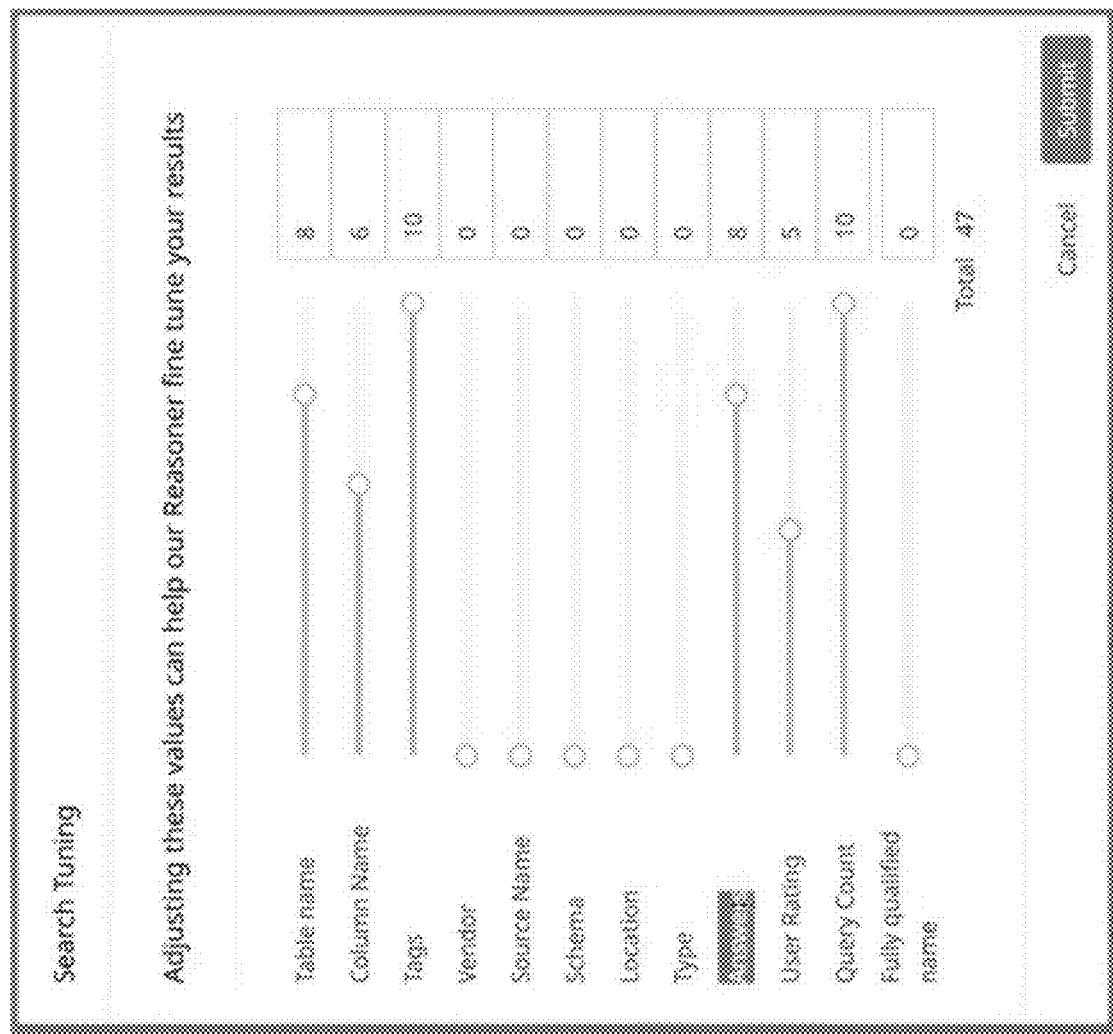
FIG. 8C is a screenshot of a user interface for allowing a user to adjust the various factors used for ranking data assets and field, according to an embodiment.

FIG. 8C is a screenshot of a user interface for allowing a user to adjust the various factors used for ranking data assets and field, according to an embodiment. According to an embodiment, the analysis system stores weights associated with each factor considered for determining data relevance scores of data assets and fields. According to an embodiment, the analysis system receives feedback on data relevance of various data assets and fields for various natural language questions and uses the feedback to learn the weights of various factors considered for determining data relevance scores of data assets and fields. The analysis system may display the weights of various factors via a user interface as shown in FIG. 8C. However, the analysis system allows the user to adjust the weights using the user interface shown in FIG. 8C, for example, using a widget such as a slider or a text box.

Figure 9:
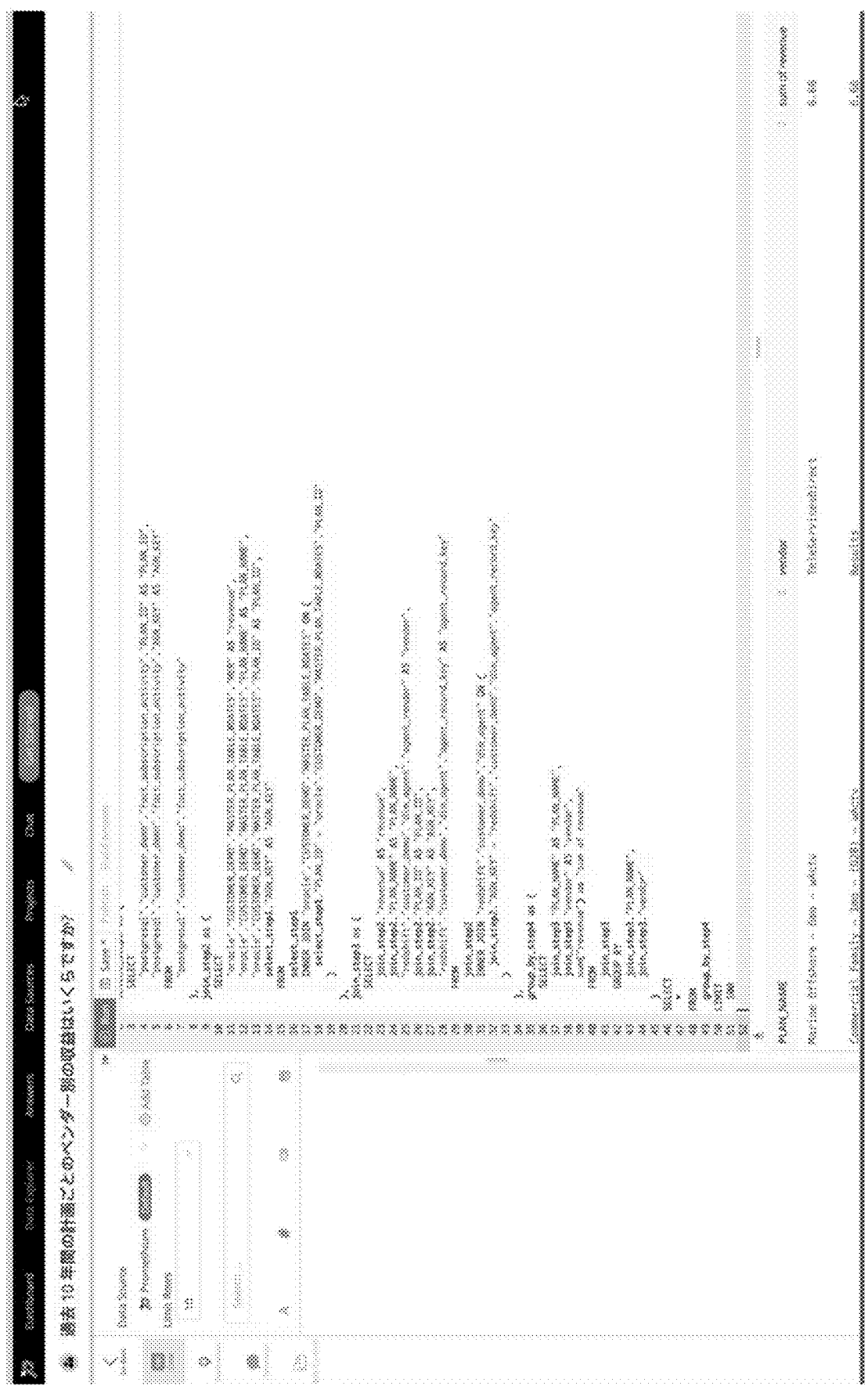
FIG. 9 illustrates that the analysis system allows users to ask natural language questions in a natural language distinct from the language used for representing metadata describing the data assets, according to an embodiment.

According to an embodiment, the analysis system allows users to ask natural language questions in various natural languages, for example, Spanish, Chinese, German, and so on, so long as the analysis system has access to a language model that processes that natural language. The natural language used for inputting the natural language question may be distinct from the natural language used by the analysis system to storing information, for example, the metadata describing the data assets, the database query, and so on. FIG. 9 illustrates that the analysis system allows users to ask natural language questions in a natural language distinct from the language used for representing metadata describing the data assets, according to an embodiment. As shown in FIG. 9, a Chinese natural language question is input to the analysis system and the analysis system is able to generate a database query for answering the question.

Figure 10:
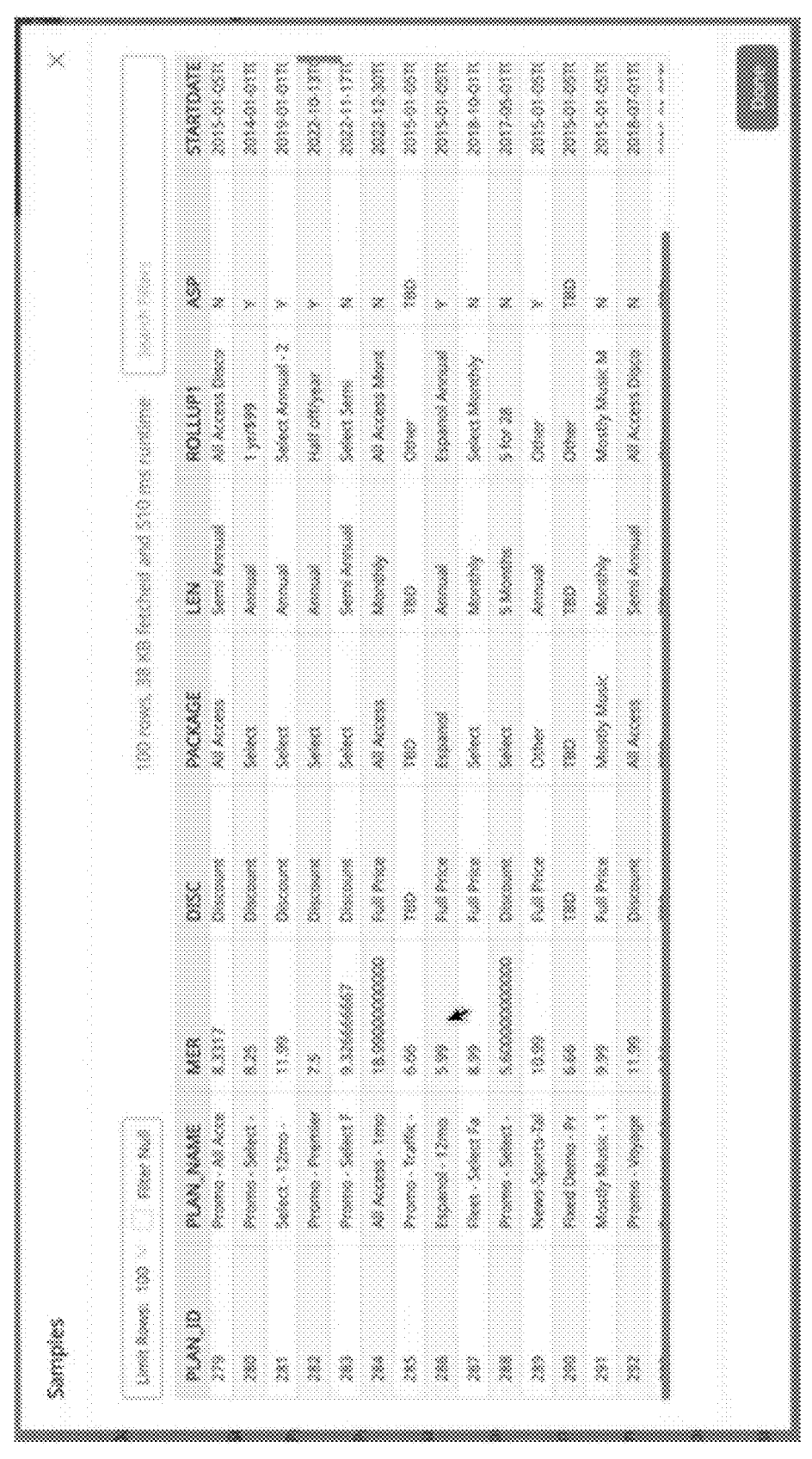

FIG. 10 illustrates a data sample that may be provided to the language model for generating a more precise database query according to an embodiment. According to an embodiment, the analysis system provides a data sample corresponding to various data assets that may be used by the language model for generating the database query. The language model may use the sample data to determine the type of each field of the data asset. Alternatively, the language model may use the sample data to determine whether a field is appropriate in a given context, for example, within an expression used in a portion of the database query such as a where clause.

Chat Interface for Natural Language Based Querying of Heterogeneous Data Sources The analysis system supports a chat-based interface that allows users to interact with the analysis system using natural language interface. The user can interact with the analysis system to access data such that natural language requests are translated into database queries that are executed using underlying data sources. The analysis system further allows users to create, schedule, and execute data pipeline using natural language prompts.

Figure 11A:
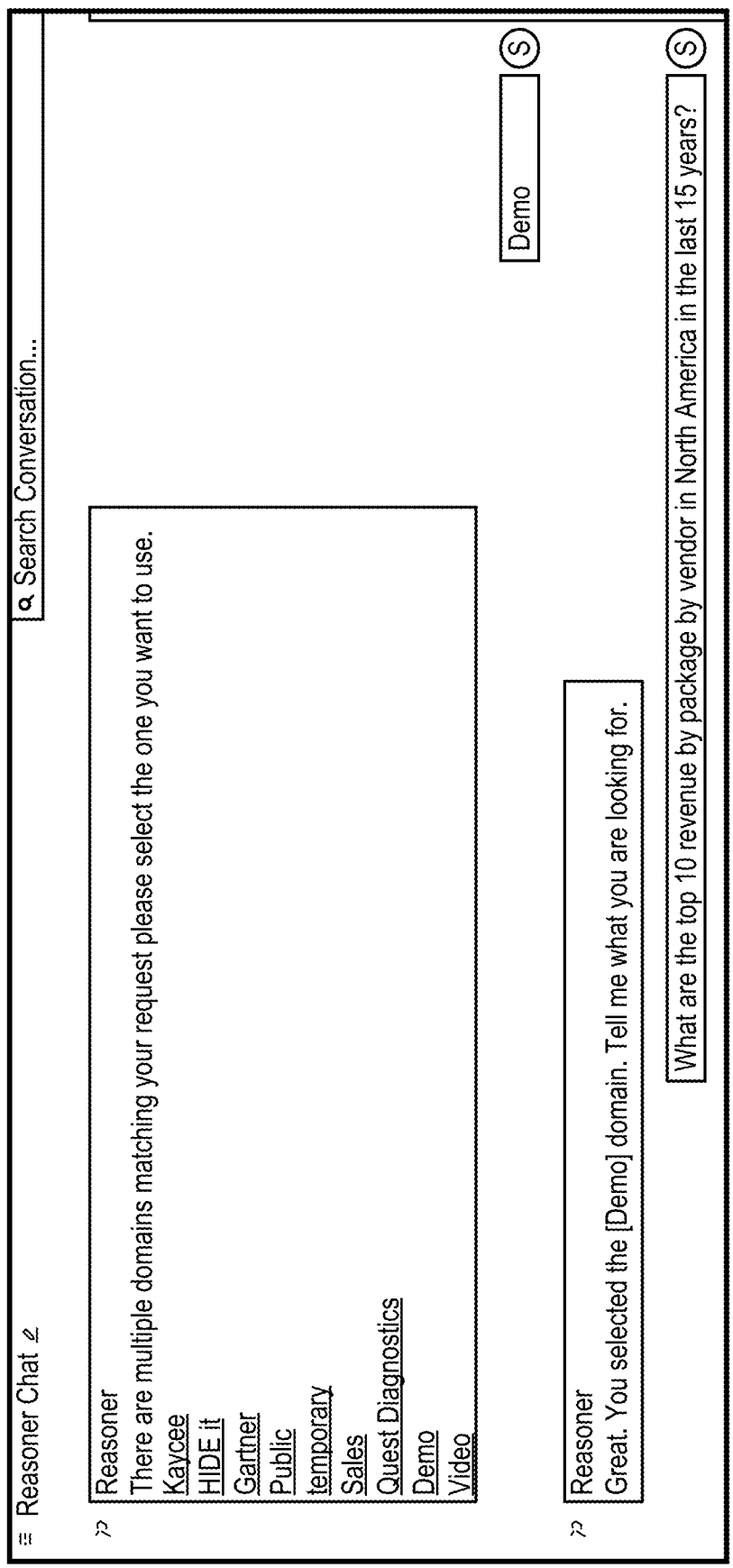
FIG. 11A illustrates a screenshot of a chat interface that illustrates an interaction between a user and the analysis system for answering a natural language question based on data stored in heterogeneous data sources, according to an embodiment.

FIG. 11A illustrates a screenshot of a chat interface that illustrates an interaction between a user and the analysis system for answering a natural language question based on data stored in heterogeneous data sources, according to an embodiment. As shown in FIG. 11A, the analysis system presents a list of domains to the user and asks the user to select a domain for use in answering the natural language question.

Figure 11B:
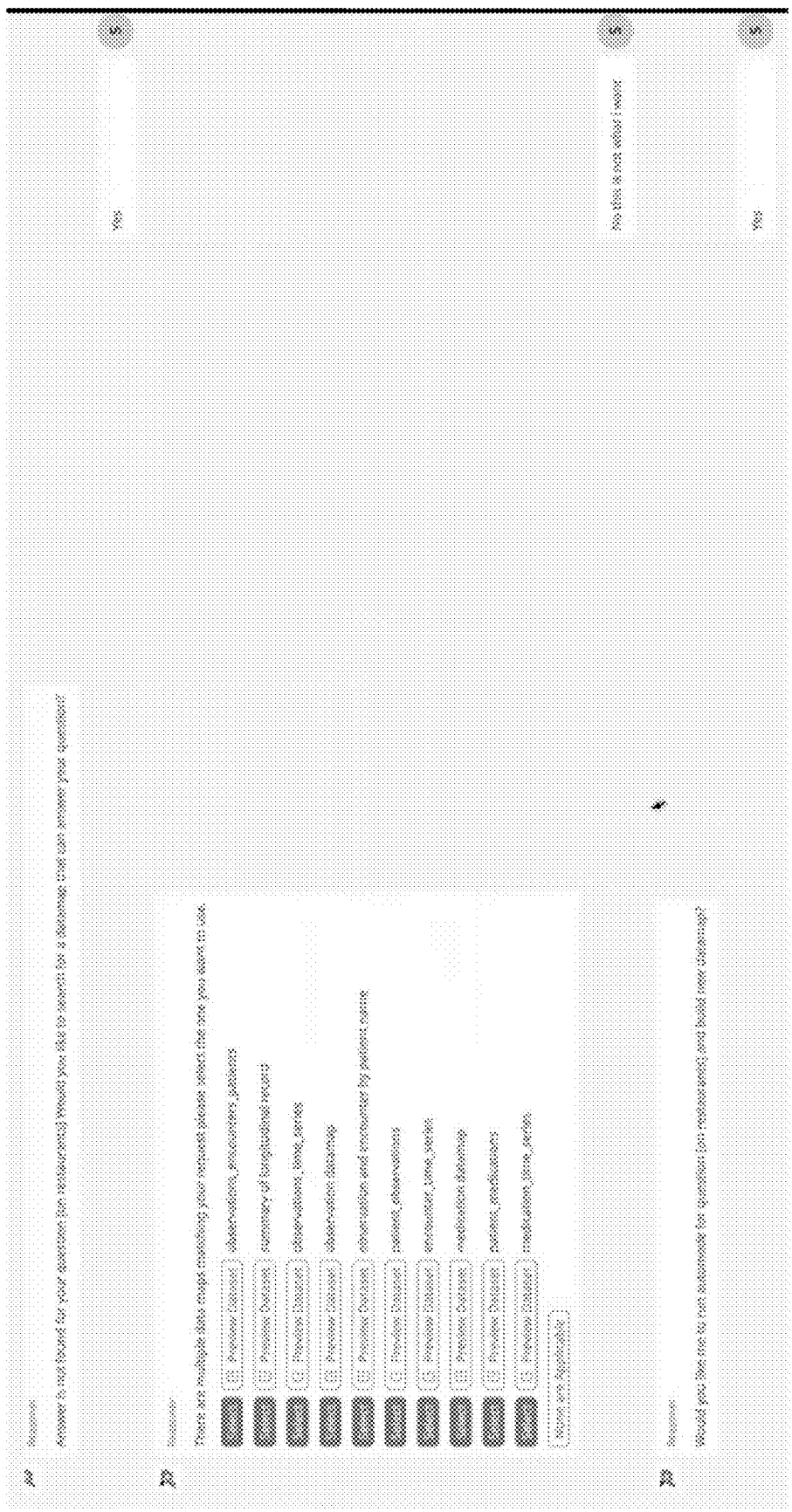
FIG. 11B illustrates a screenshot of a chat interface illustrating how the analysis system allows users to select a previously created data map, according to an embodiment.

FIG. 11B illustrates a screenshot of a chat interface illustrating how the analysis system allows users to select a previously created data map, according to an embodiment. The analysis system selects a subset of available data maps that were previously generated and presents them to the user via the chat interface. The data maps are displayed along with widgets for allowing uses to select a particular data map that the user determines as being relevant for answering the natural language question.

Figure 11C:
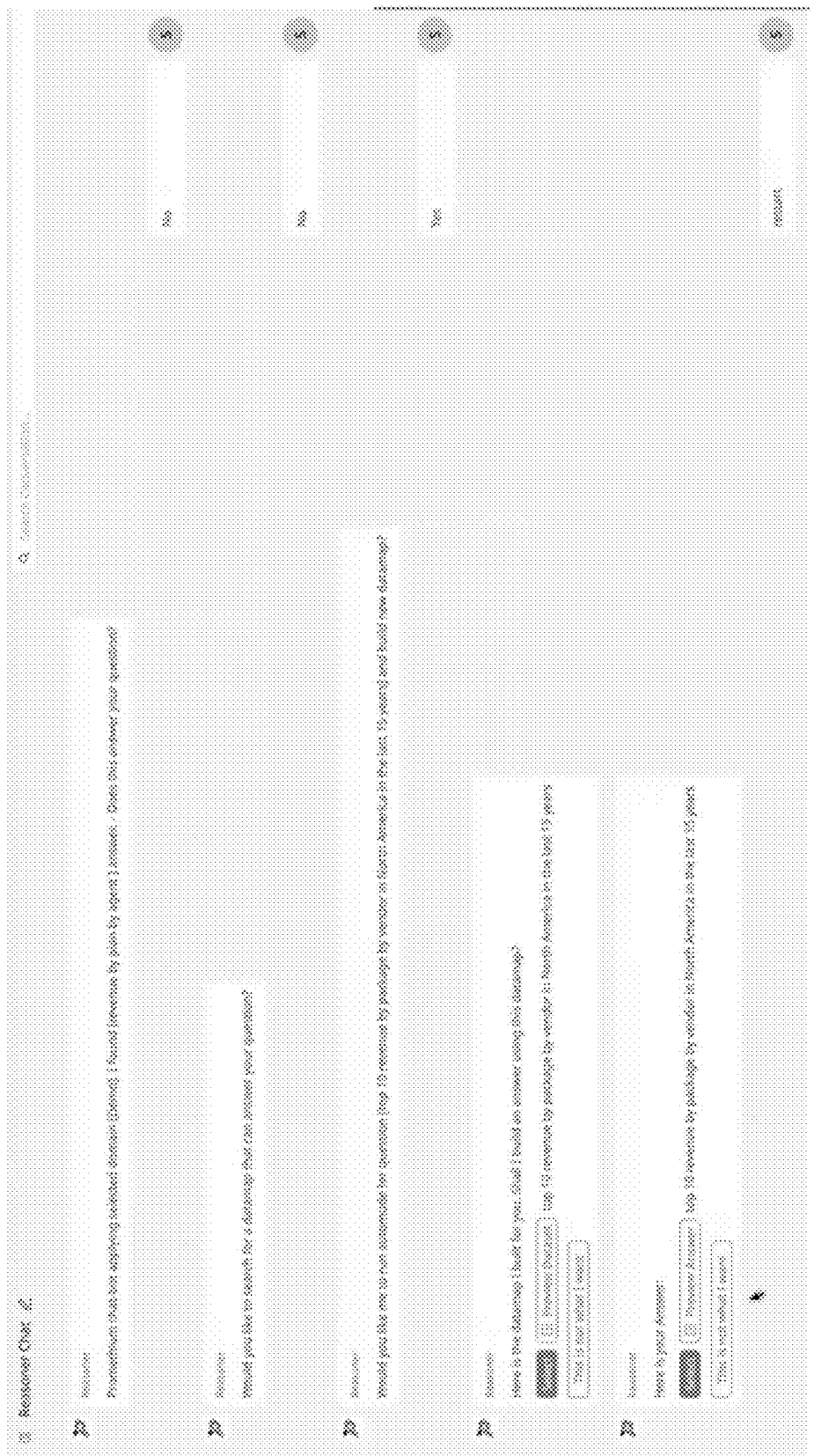
FIG. 11C illustrates a screenshot of a chat interface illustrating how the analysis system allows users to create a new data map to answer a natural language question, according to an embodiment.

FIG. 11C illustrates a screenshot of a chat interface illustrating how the analysis system allows users to create a new data map to answer a natural language question, according to an embodiment. FIG. 11C confirms with the user, whether the user wants to generate a new data map if the previously generated data maps are determined to be not relevant to the natural language question. If the user requests generation of a new data map. The analysis system generates a new data map.

Figure 12:
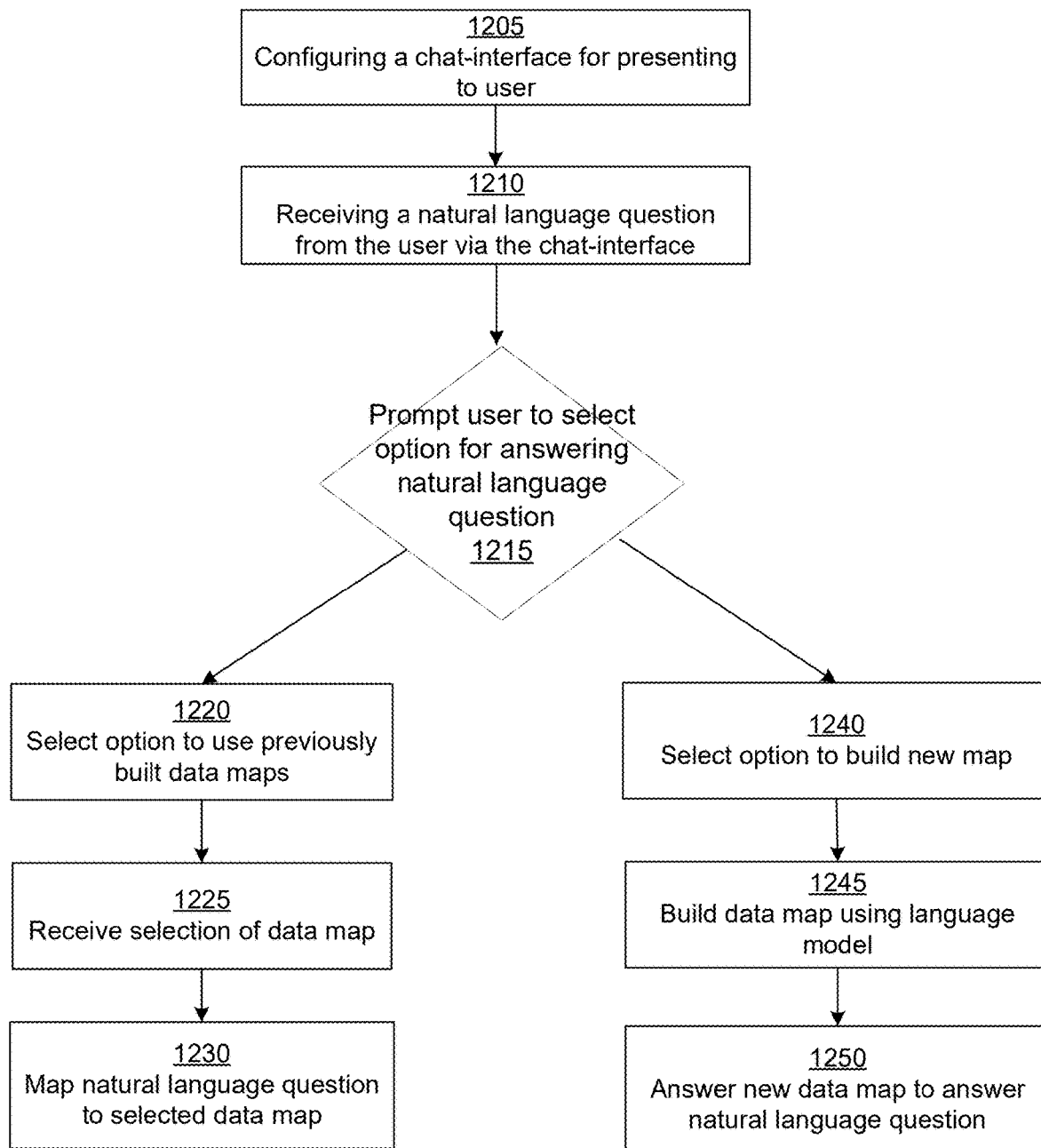
FIG. 12 is a flowchart illustrating a process used by the analysis system for answering a natural language question using a chat-interface, according to an embodiment.

FIG. 12 is a flowchart illustrating a process used by the analysis system for answering a natural language question using a chat-interface, according to an embodiment. The steps shown in the flowchart may be performed in an order different from that indicated in the figure.

The analysis system configures 1205 a chat-interface for natural language based querying of heterogeneous data sources. The chat-interface is presented to a user via a client device. The chat-interface includes widgets comprising a text box for user to enter natural language text and a panel that displays responses generated by the analysis system as well as previous interactions.

The analysis system receives 1210, via the chat-interface, a request from the user to answer a natural language question based on data stored in one or more data assets, each data asset stored in a data source from a plurality of heterogenous data sources.

The analysis system interacts with the user via the chat-interface using natural language interactions to obtain further information describing how the natural language question should be answered. The analysis system prompts 1215 the user via the chat-interface to select an option for answering the natural language question. The analysis system may present the various options in an order and request a confirmation from the user if the user wants to use that option. If the user declines to use an option, the analysis system checks with the user if the user wants to use the next option.

The analysis system asks the user if the user wants to select 1220 a data map that was previously generated using the language model for answering the natural language question. The analysis system searches for existing data maps that may be used for answering the natural language question and presents a list of data maps, for example, as illustrated in FIG. 11B. The user may select one of the data maps presented or indicate that none of the data maps are usable for answering the natural language question.

According to an embodiment, the analysis system selects a subset of the data maps previously created that match the natural language question received. Each data map is associated with information describing the data map including information identifying the data assets that were used for answering a particular natural language question, the fields of the data assets that were used, the clauses of the database query for which each field was used, the description of the data assets, sample data of the data assets, and the natural language question(s) for which the data map was created or subsequently used for answering. The analysis system stores the above information describing each data map. The analysis system selects a subset of data maps by matching the above information describing each data map with the natural language question.

According to an embodiment, the analysis system generates a prompt for the language model requesting the language model to select a subset of data maps suitable for answering the natural language question. The analysis system receives the data map generated by the language model. The generated data map comprises one or more data assets and their descriptions. However, the generated data map is not based on actual data assets since the analysis system does not provide any information about available data assets in the prompt requesting the language model to generate a data map for answering the natural language question. The analysis system compares the data map generated by the language model with data maps previously generated by the analysis system.

According to an embodiment, the analysis system generates a prompt specifying information describing a set of data maps and the natural language question and requesting the language model to identify a particular data map to use. The analysis system receives from the language model, a subset of data maps that the language model determines as matching the natural language question. Note that the analysis system may include a language model and can execute the language model rather than send the prompt to an external system. According to an embodiment, the analysis system generates a prompt that specifies a set of natural language questions, each natural language question associated with a data map previously created and requests the language model to identify a subset of matching natural language questions from the set. The analysis system selects a subset of data maps corresponding to each of the subset of natural language questions identified by the language model. The analysis system presents the subset of data maps determined to the user and receives a selection of a data map from the user. Alternatively, the analysis system receives an indication from the user that none of the selected data maps are suitable for answering the new natural language question.

According to an embodiment, the analysis system generates a prompt for the language model requesting the language model to generate a data map for answering the natural language question. The analysis system receives the data map generated by the language model. The generated data map comprises one or more data assets and their descriptions. However, the generated data map is not based on actual data assets since the analysis system does not provide any information about available data assets in the prompt requesting the language model to generate a data map for answering the natural language question. The analysis system compares the data map generated by the language model with data maps previously generated by the analysis system. According to an embodiment, the analysis system generates a prompt specifying information describing a set of data maps and the natural language question and requesting the language model to identify a particular data map to use. The analysis system receives from the language model, a particular data map that the language model determines as the closest match to the natural language question. Note that the analysis system may include a language model and can execute the language model rather than send the prompt to an external system. According to an embodiment, the analysis system generates a prompt that specifies a set of natural language questions, each natural language question associated with a data map previously created and requests the language model to identify the closest matching natural language question from the set. The analysis system determines the closest matching natural language question from the set based on the response of the language model. The analysis system selects the data map corresponding to the natural language question from the set identified by the language model.

The analysis system may receive 1225 a selection of a data map from the user for answering the natural language question. If the analysis system receives 1225 a selection of a data map from the user, the analysis system maps 1230 the natural language question to the selected data map for answering the natural language question. For example, the data map may identify data assets that can be used by the system and the analysis system may regenerate the database query using the data assets of the selected data map.

The analysis system asks the user if the user wants to select the option to build 1240 a new data map for the natural language question using the language model.

If the user selects the option to build a new data map, the analysis system executes a process similar to the flowchart illustrated in FIG. 7 for answering the natural language question. The analysis system builds a new data map for answering the natural language question and saves the data map including the metadata describing the data assets used for answering the natural language question, the fields used for answering the natural language question, and the database query used for answering the natural language question. The stored data map may be subsequently used for answering new natural language questions received.

The analysis system answers the natural language question using one of the options selected by the user and presents the results to the user. The results may be presented in a tabular form or as a chart, for example, a graph such as a pie chart, bar graph, like graph, and so on.

Accordingly, the user can use the chat-interface to interact with the analysis system to access data as well as create, schedule, and execute data pipeline using natural language prompts.

Automated Processing of Natural Language Questions/Commands

Figure 13A:
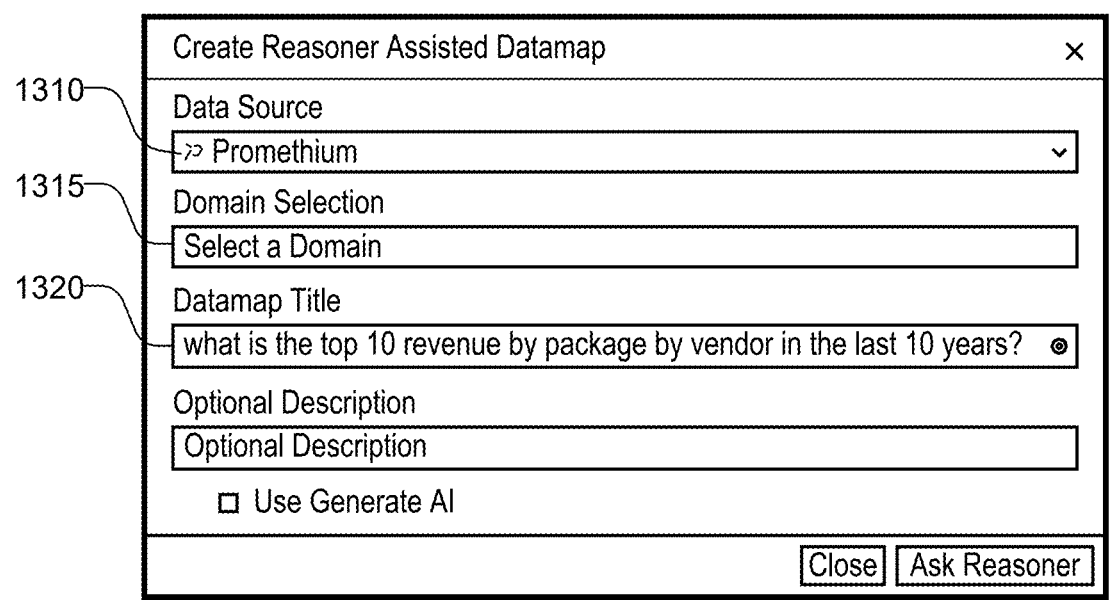
FIG. 13A illustrates a screenshot of a user interface that allows users to ask a natural language question based on data stored in heterogeneous data sources, according to an embodiment.

FIG. 13A illustrates a screenshot of a user interface that allows users to ask a natural language question based on data stored in heterogeneous data sources, according to an embodiment. As shown in FIG. 13A, the user interface presented to the user receives from the user, the natural language question 1320 as input, and optionally a data source 1310 for use in answering the natural language question and a domain 1315 for use in answering the question. A domain is associated with a subset of data assets and narrows down the set of data assets to consider for answering the natural language question. The various inputs are received via widgets, for example, the natural language question received via a text widget that allows users to enter free text, and the domain selection may be via a drop-down list that lists available domains to select from. The natural language input may represent commands to the data source that result in automatic generation and execution of data pipelines.

Figure 13B:
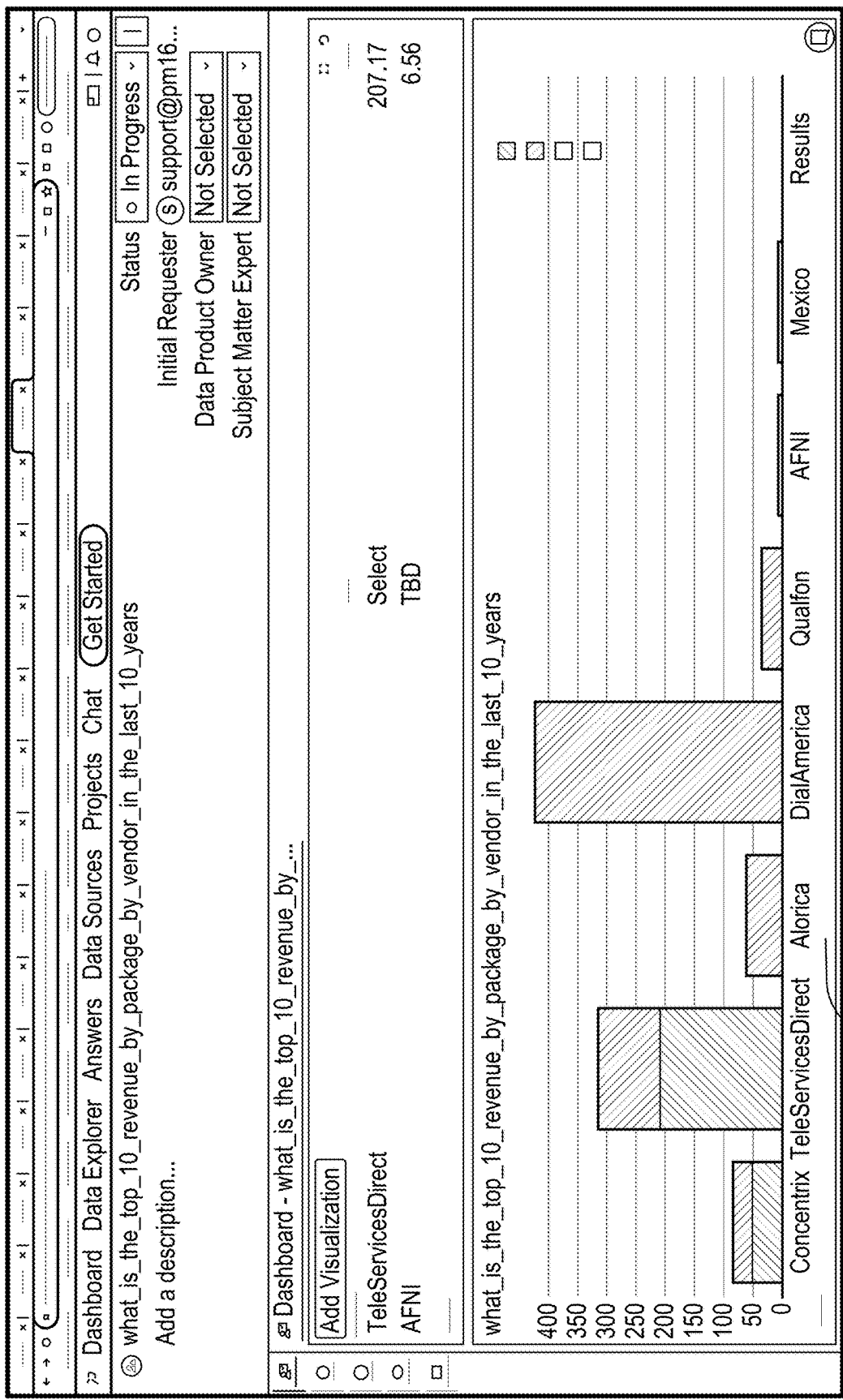
FIG. 13B illustrates a screenshot of a user interface displaying an answer to the natural language question asked by the user in FIG. 13A without requiring further input from the user, according to an embodiment.

FIG. 13B illustrates a screenshot of a user interface displaying an answer to the natural language question asked by the user in FIG. 13A without requiring further input from the user, according to an embodiment. The analysis system processes the natural language question by either generating a new data map or by using an existing data map. The result may be presented in a tabular form or as a chart 1330 via the user interface.

Figure 14:
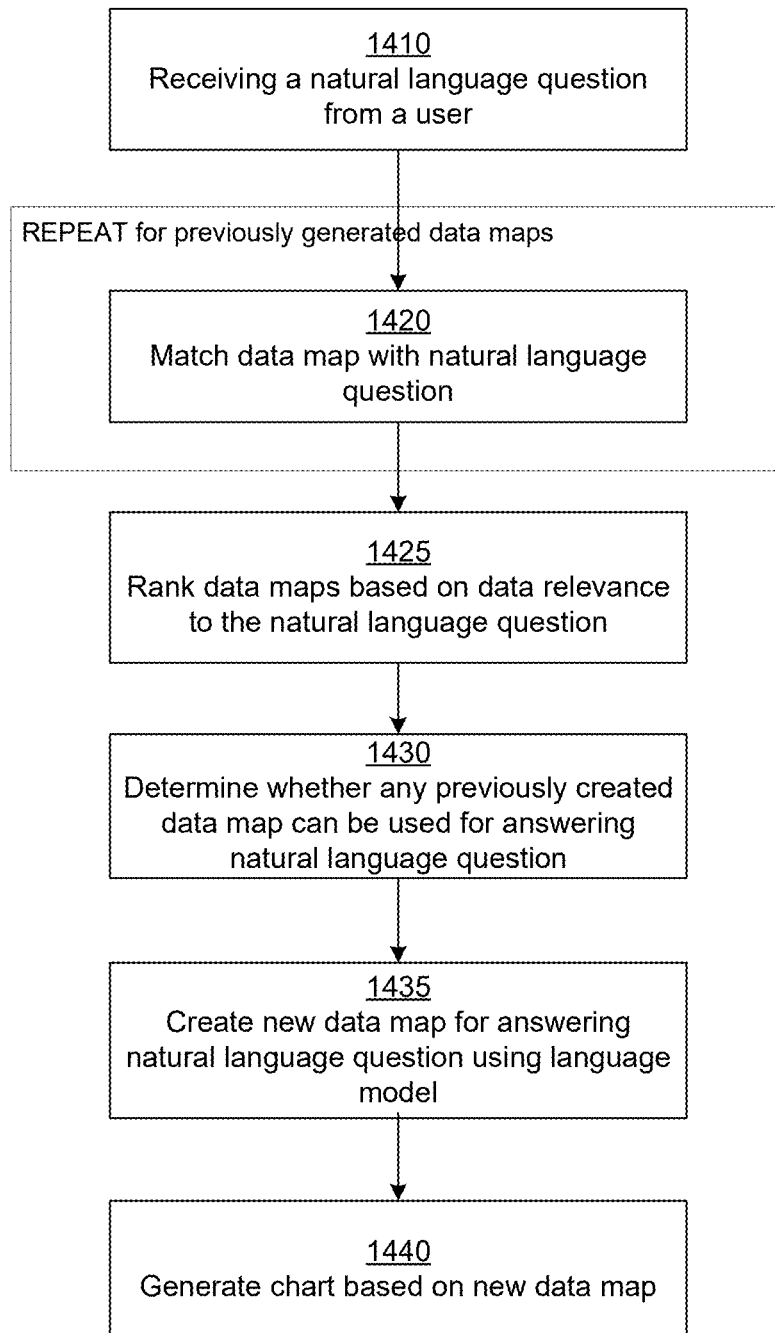
FIG. 14 is a flowchart illustrating a process used by the analysis system for automatically answering a natural language question based on heterogeneous data sources, according to an embodiment.

FIG. 14 is a flowchart illustrating a process used by the analysis system for automatically answering a natural language question based on heterogeneous data sources, according to an embodiment. The steps shown in the flowchart may be performed in an order different from that indicated in the figure.

The analysis system receives a request to process a natural language question from a client device. For example, the request may be received via a user interface such as the user interface illustrated in FIG. 13A. The natural language question is based on data stored in heterogeneous data sources.

The analysis system matches 1420 the natural language question against previously created data maps. The analysis system determines whether any existing data map can be used to answer the natural language question. Each data map identifies data assets stored in the data sources as well as fields of the data assets. There may be several data assets that can match a natural language question. Accordingly, the computational effort used to select a subset of data maps as suitable for answering previous natural language question is reused to answer the received natural language question. If a previously asked question is similar to the received natural language question, the analysis system determines whether the execution plan and the data map generated for the previously asked question can be reused either as it is or after modifications.

According to an embodiment, the analysis system ranks 1425 data maps previously created based on their relevance to the natural language question and selects a subset of the data maps previously created that match the natural language question received. Each data map is associated with information describing the data map including information identifying the data assets that were used for answering a particular natural language question, the fields of the data assets that were used, the clauses of the database query for which each field was used, the description of the data assets, sample data of the data assets, and the natural language question(s) for which the data map was created or subsequently used for answering. The analysis system stores the above information describing each data map. The analysis system selects a subset of data maps by matching the above information describing each data map with the natural language question.

According to an embodiment, the analysis system ranks the data maps by determining a data relevance score for each data map and ordering the data maps based on their data relevance score with respect to the received natural language question. The data relevance score for a data map with respect to a natural language question may be determined as an aggregate of data relevance scores of individual data assets of the data map with respect to the natural language question. The analysis system selects a previously created data map based on their data relevance scores, for example, by selecting a previously created data map that has the highest data relevance score with respect to the received natural language question. According to an embodiment, the analysis system compares the data relevance score of the selected data map with a threshold value to determine whether the selected data map is suitable for answering the natural language question. The analysis system may determine based on the comparison of the data relevance score of the selected data map with the threshold value that the selected data map is useful for answering the natural language question. In this case, the analysis system may further modify the data map to answer the natural language question. For example, the analysis system may identify different fields of the data map that are relevant to answering the received natural language question compared to the fields that were used for answering the previous natural language question for which the data map may have been created.

The analysis system may determine based on the comparison of the data relevance score of the selected data map with the threshold value that the selected data map is not useful for answering the received natural language question. In this case, the analysis system creates 1435 a new data map for answering the natural language question. The analysis system may execute a process similar to FIG. 12 and FIG. 7 for generating a data map, except that instead of asking the user for any further information, the analysis system makes an automatic determination based on available information at each step.

According to an embodiment, the analysis system generates a prompt for the language model requesting the language model to generate a data map for answering the natural language question. The analysis system receives the data map generated by the language model. The generated data map comprises one or more data assets and their descriptions. However, the generated data map is not based on actual data assets since the analysis system does not provide any information about available data assets in the prompt requesting the language model to generate a data map for answering the natural language question. The analysis system compares the data map generated by the language model with data maps previously generated by the analysis system. According to an embodiment, the analysis system generates a prompt specifying information describing a set of data maps and the natural language question and requesting the language model to identify a particular data map to use. The analysis system receives from the language model, a particular data map that the language model determines as the closest match to the natural language question. Note that the analysis system may include a language model and can execute the language model rather than send the prompt to an external system. According to an embodiment, the analysis system generates a prompt that specifies a set of natural language questions, each natural language question associated with a data map previously created and requests the language model to identify the closest matching natural language question from the set. The analysis system determines the closest matching natural language question from the set based on the response of the language model. The analysis system selects the data map corresponding to the natural language question from the set identified by the language model.

The analysis system may configure and generate 1440 a chart based on the data map and send the chart for display via the client device. Alternatively, the analysis system may send the result set obtained from the data map to the client device.

According to an embodiment, the process illustrated in FIG. 7, FIG. 12, or FIG. 14, receives a graphical chart as input, for example, a histogram, a pie chart, a scatter plot, a line chart, and so on. The analysis system may provide a graphical design utility that allows the user to draw a chart. Alternatively, the user may generate a chart using any external tool and provide as input to the analysis system, for example, as a scanned image. The user further annotates the chart, for example, by providing natural language description of the various axes of a histogram, line graph, or scatter plot. Alternatively, the user may provide example values for slices of the pie chart. The analysis system may use a convolutional neural network to analyze the images to generate an embedding that is provided as input to a language model. Alternatively, the language model is trained to receive images as input. The language model receives the image as input and generates a database query for generating data that can be used for building the chart. The analysis system modifies the database query, for example, as shown in FIG. 7, 12, or 14 to use data assets and field names of actual data assets and fields respectively and executes the database query to obtain results. The analysis system generates a chart that is based on actual data stored in the data sources and displays via the user interface.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to these signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating virtual databases from point-in-time copies of production databases stored in a storage manager. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for answering a natural language question based on heterogeneous data sources, the computer-implemented method comprising:
    storing metadata describing a plurality of data assets, wherein each of the plurality of data assets is stored in a data source of a plurality of data sources;
    receiving, from a client device, a request to process a natural language question based on the plurality of data sources;
    matching the natural language question against one or more data maps previously created, wherein each of the one or more data maps is based on data assets stored in the plurality of data sources;

determining whether a data map previously created is usable for answering the natural language question;

responsive to determining that none of the one or more data maps previously created can be used for answering the natural language question, generating a new data map for the natural language question based on a database query generated using a machine learning based language model;

configuring a chart based on the data map; and sending the chart for display via the client device.

2. The computer-implemented method of claim 1, wherein generating the database query using the machine learning based language model comprises:

generating a prompt requesting a database query using syntax of a database query language, the database query corresponding to the natural language question;

sending the prompt to a machine learning based language model; and receiving a database query using syntax of a database query language generated by the machine learning based language model.

3. The computer-implemented method of claim 2, wherein the database query includes one or more generated data asset names, the computer-implemented method further comprising:

for each of the one or more generated data asset names, determining a data asset corresponding to the generated data asset name based on metadata describing the data asset;

modifying the database query by replacing each of the one or more generated data asset names by a name of the data asset corresponding to the generated data asset name; and sending the modified database query for execution.

4. The computer-implemented method of claim 3, wherein determining the data asset corresponding to the generated data asset name comprises:

ranking a set of data assets based on one or more factors associated with the generated data asset name; and selecting the data asset based on the ranking.

5. The computer-implemented method of claim 1, wherein determining whether a data map previously created is usable for answering the natural language question:

matching the natural language question with information describing each of one or more data maps previously created; and determining that a data map previously created is usable for answering the natural language question based on a degree of match between the natural language question and the data map previously created.

6. The computer-implemented method of claim 5, wherein matching the natural language question with information describing each of one or more data maps previously created comprises:

generating a prompt comprising the information describing each of one or more data maps previously created and the natural language question, the prompt requesting the machine learning based language model to select a data map previously created based on the matching; and sending the prompt for execution to the machine learning based language model.

7. The computer-implemented method of claim 5, wherein matching the natural language question with information describing each of one or more data maps previously created, further comprises:

receiving a response identifying a data map previously created from the machine learning based language model; and determining whether a data map identified by the machine learning based language model includes data assets for answering the natural language question.

8. A non-transitory computer-readable storage medium storing computer-executable instructions for executing on one or more computer processors, the computer-executable instructions when executed by the one or more computer processors cause the one or more computer processors to perform steps comprising:

storing metadata describing a plurality of data assets, wherein each of the plurality of data assets is stored in a data source of a plurality of data sources;

receiving, from a client device, a request to process a natural language question based on the plurality of data sources;

matching the natural language question against one or more data maps previously created, wherein each of the one or more data maps is based on data assets stored in the plurality of data sources;

determining whether a data map previously created is usable for answering the natural language question;

responsive to determining that none of the one or more data maps previously created can be used for answering the natural language question, generating a new data map for the natural language question based on a database query generated using a machine learning based language model;

configuring a chart based on the data map; and sending the chart for display via the client device.

9. The non-transitory computer-readable storage medium of claim 8, wherein generating the database query using the machine learning based language model comprises:

generating a prompt requesting a database query using syntax of a database query language, the database query corresponding to the natural language question;

sending the prompt to a machine learning based language model; and receiving a database query using syntax of a database query language generated by the machine learning based language model.

10. The non-transitory computer-readable storage medium of claim 9, wherein the database query includes one or more generated data asset names, wherein the computer-executable instructions further cause the one or more computer processors to perform steps comprising for each of the one or more generated data asset names, determining a data asset corresponding to the generated data asset name based on metadata describing the data asset;

modifying the database query by replacing each of the one or more generated data asset names by a name of the data asset corresponding to the generated data asset name; and sending the modified database query for execution.

11. The non-transitory computer-readable storage medium of claim 10, wherein determining the data asset corresponding to the generated data asset name comprises:

ranking a set of data assets based on one or more factors associated with the generated data asset name; and selecting the data asset based on the ranking.

12. The non-transitory computer-readable storage medium of claim 8, wherein determining whether a data map previously created is usable for answering the natural language question:

matching the natural language question with information describing each of one or more data maps previously created; and determining that a data map previously created is usable for answering the natural language question based on a degree of match between the natural language question and the data map previously created.

13. The non-transitory computer-readable storage medium of claim 12, wherein matching the natural language question with information describing each of one or more data maps previously created comprises:

generating a prompt comprising the information describing each of one or more data maps previously created and the natural language question, the prompt requesting the machine learning based language model to select a data map previously created based on the matching; and sending the prompt for execution to the machine learning based language model.

14. The non-transitory computer-readable storage medium of claim 12, wherein matching the natural language question with information describing each of one or more data maps previously created, further comprises:

receiving a response identifying a data map previously created from the machine learning based language model; and determining whether a data map identified by the machine learning based language model includes data assets for answering the natural language question.

15. A computer system comprising:

a computer processor; and a non-transitory computer-readable storage medium storing computer-executable instructions for executing on a computer processor, the computer-executable instructions when executed by the computer processor cause the computer processor to perform steps comprising:

storing metadata describing a plurality of data assets, wherein each of the plurality of data assets is stored in a data source of a plurality of data sources;

receiving, from a client device, a request to process a natural language question based on the plurality of data sources;

matching the natural language question against one or more data maps previously created, wherein each of the one or more data maps is based on data assets stored in the plurality of data sources;

determining whether a data map previously created is usable for answering the natural language question;

responsive to determining that none of the one or more data maps previously created can be used for answering the natural language question, generating a new data map for the natural language question based on a database query generated using a machine learning based language model;

configuring a chart based on the data map; and sending the chart for display via the client device.

16. The computer system of claim 15, wherein generating the database query using the machine learning based language model comprises:

generating a prompt requesting a database query using syntax of a database query language, the database query corresponding to the natural language question;

sending the prompt to a machine learning based language model; and receiving a database query using syntax of a database query language generated by the machine learning based language model.

17. The computer system of claim 16, wherein the database query includes one or more generated data asset names wherein the computer-executable instructions further cause the one or more computer processors to perform steps comprising:

for each of the one or more generated data asset names, determining a data asset corresponding to the generated data asset name based on metadata describing the data asset;

modifying the database query by replacing each of the one or more generated data asset names by a name of the data asset corresponding to the generated data asset name; and sending the modified database query for execution.

18. The computer system of claim 17, wherein determining the data asset corresponding to the generated data asset name comprises:

ranking a set of data assets based on one or more factors associated with the generated data asset name; and selecting the data asset based on the ranking.

19. The computer system of claim 15, wherein determining whether a data map previously created is usable for answering the natural language question:

matching the natural language question with information describing each of one or more data maps previously created; and determining that a data map previously created is usable for answering the natural language question based on a degree of match between the natural language question and the data map previously created.

20. The computer system of claim 19, wherein matching the natural language question with information describing each of one or more data maps previously created comprises:

generating a prompt comprising the information describing each of one or more data maps previously created and the natural language question, the prompt requesting the machine learning based language model to select a data map previously created based on the matching;

receiving a response identifying a data map previously created from the machine learning based language model; and determining whether a data map identified by the machine learning based language model includes data assets for answering the natural language question; and sending the prompt for execution to the machine learning based language model.

* * * * *